US012591131B2

(12) United States Patent
Tabata et al.

(10) Patent No.: US 12,591,131 B2
(45) Date of Patent: Mar. 31, 2026

(54) LIGHT SOURCE DEVICE, CONTROL METHOD, AND COMPUTER-READABLE RECORDING MEDIUM

(71) Applicant: OLYMPUS MEDICAL SYSTEMS CORP., Tokyo (JP)

(72) Inventors: Motoki Tabata, Akishima (JP); Yusuke Yabe, Chofu (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 309 days.

(21) Appl. No.: 18/225,802

(22) Filed: Jul. 25, 2023

(65) Prior Publication Data

US 2024/0160007 A1 May 16, 2024

Related U.S. Application Data

(63) Continuation of application No. PCT/JP2021/003388, filed on Jan. 29, 2021.

(51) Int. Cl.
| | |
|---|---|
| *H04N 9/31* | (2006.01) |
| *G02B 5/02* | (2006.01) |
| *G02B 26/00* | (2006.01) |
| *G02B 27/14* | (2006.01) |
| *G02B 27/48* | (2006.01) |
| *H04N 23/10* | (2023.01) |

(Continued)

(52) U.S. Cl.
CPC ......... *G02B 26/008* (2013.01); *H04N 23/125* (2023.01); *H04N 23/55* (2023.01); *H04N 23/555* (2023.01); *H04N 23/56* (2023.01)

(58) Field of Classification Search
None
See application file for complete search history.

(56) References Cited

U.S. PATENT DOCUMENTS

| | | | |
|---|---|---|---|
| 10,684,541 | B1 | 6/2020 | Lin et al. |
| 2015/0362135 | A1 | 12/2015 | Sugiyama |

(Continued)

FOREIGN PATENT DOCUMENTS

| | | |
|---|---|---|
| JP | 2012-159685 A | 8/2012 |
| JP | 2016-000073 A | 1/2016 |

(Continued)

OTHER PUBLICATIONS

International Search Report dated Apr. 13, 2021 received in PCT/JP2021/003388.

(Continued)

*Primary Examiner* — Carl Adams
(74) *Attorney, Agent, or Firm* — Scully, Scott, Murphy & Presser, P.C.

(57) ABSTRACT

A light source device includes: a fluorescent material configured to rotate about a rotation axis, and emit fluorescence upon reception of excitation light; a light source configured to emit the excitation light; an optical filter that is arranged to cover a part of the fluorescent material from a direction along the rotation axis, the optical filter being configured to pass light of some wavelength band in the fluorescence generated by excitation of the fluorescent material; and a first processor configured to control a rotation operation of the fluorescent material about the rotation axis, and an operation of the light source.

13 Claims, 29 Drawing Sheets

(51) Int. Cl.
    *H04N 23/50*        (2023.01)
    *H04N 23/55*        (2023.01)
    *H04N 23/56*        (2023.01)

(56)            References Cited

U.S. PATENT DOCUMENTS

| | | | |
|---|---|---|---|
| 2017/0111620 A1* | 4/2017 | Tian | G03B 21/204 |
| 2017/0328540 A1 | 11/2017 | Paul et al. | |
| 2018/0080630 A1 | 3/2018 | Wang et al. | |
| 2020/0192203 A1 | 6/2020 | Lin et al. | |
| 2023/0028724 A1* | 1/2023 | Kunze | G02B 21/0076 |

FOREIGN PATENT DOCUMENTS

| | | |
|---|---|---|
| JP | 2016-001669 A | 1/2016 |
| JP | 2016-161709 A | 9/2016 |
| JP | 2017-209530 A | 11/2017 |
| JP | 2018-038675 A | 3/2018 |

OTHER PUBLICATIONS

Chinese Office Action dated Oct. 23, 2025 received in 202180091871.7.

* cited by examiner

LIGHT SOURCE DEVICE, CONTROL METHOD, AND COMPUTER-READABLE RECORDING MEDIUM

CROSS-REFERENCE TO RELATED APPLICATION

This application is a continuation of International Application No. PCT/JP2021/003388, filed on Jan. 29, 2021, the entire contents of which are incorporated herein by reference.

BACKGROUND

1. Technical Field

The present disclosure relates to a light source device, a control method, and a computer-readable recording medium.

2. Related Art

In the related art, to achieve great luminosity for illumination light, a light source device for an endoscope that includes an excitation light source that emits excitation light, and a fluorescent material that emits fluorescence upon receiving irradiation of the excitation light, and that supplies fluorescence emitted by the fluorescent material to an endoscope has been known (for example, JP-A-2017-209530).

In the light source for an endoscope described in JP-A-2017-209530, to prevent deterioration of the fluorescent material due to locally concentrated irradiation of excitation light, the irradiation position is changed by rotating the fluorescent material.

In the related art, a first observation mode of observing (normal observation) a subject by using white light and a second observation mode of observing (narrow band imaging (NBI) observation) a subject by using a narrow band green light have been known. When these respective first and second observation modes are performed, it is necessary to switch light to irradiate the subject between whiter light and narrow band green light according to the observation mode. A light source device for an endoscope enabled to switch between white light and narrow green light has conventionally been known (for example, JP-A-2018-38675).

The light source for an endoscope described in JP-A-2018-38675 includes a rotation filter that can rotate. In this rotation filter, a wide band green filter is arranged on an outer side of the radial direction, and a narrow band green filter is arranged on an inner side of the radial direction. The wide band green filter is a filter that passes light with an entire wavelength band of green light in the green light emitted from a green light emitting diode (LED) light source. Moreover, the narrow band green filter is a filter that passes light with a part of the wavelength band of green (narrow band green light) in the green light emitted from the green LED light source. In the light source device for an endoscope, the rotation filter is moved in the radial direction according to the observation mode, and an irradiation position of the green light from the green LED light source is changed.

SUMMARY

In some embodiments, a light source device includes: a fluorescent material configured to rotate about a rotation axis, and emit fluorescence upon reception of excitation light; a light source configured to emit the excitation light; an optical filter that is arranged to cover a part of the fluorescent material from a direction along the rotation axis, the optical filter being configured to pass light of some wavelength band in the fluorescence generated by excitation of the fluorescent material; and a first processor configured to control a rotation operation of the fluorescent material about the rotation axis, and an operation of the light source, the first processor being configured to control the rotation operation of the fluorescent material such that the optical filter is placed at and removed from an irradiation position at which the excitation light is irradiated to the fluorescent material according to an imaging period in which the fluorescence reflected from a subject is captured by an imager.

In some embodiments, provided is a control method performed by a processor of a light source device including a fluorescent material configured to rotate about a rotation axis, and emit fluorescence upon reception of excitation light, a light source configured to emit the excitation light, and an optical filter that is arranged to cover a part of the fluorescent material from a direction along the rotation axis, the optical filter being configured to pass light of some wavelength band in the fluorescence generated by excitation of the fluorescent material. The method includes: in a first observation mode, controlling a rotation operation of the fluorescent material to set such that an imaging period in which the fluorescence reflected from a subject is captured by an imager and a first period in which an area without the optical filter is positioned at an irradiation position at which the excitation light is irradiated to the fluorescent material overlap, the first observation mode being a normal observation mode to observe the subject by using the fluorescence that has been generated upon the excitation of the fluorescent material and that has not passed through the optical filter; and lighting the light source in a second period in which the imaging period and the first period overlap.

In some embodiments, provided is a non-transitory computer-readable recording medium that stores a computer program to be executed by a processor of a light source device including a fluorescent material configured to rotate about a rotation axis, and emit fluorescence upon reception of excitation light, a light source configured to emit the excitation light, and an optical filter that is arranged to cover a part of the fluorescent material from a direction along the rotation axis, the optical filter being configured to pass light of some wavelength band in the fluorescence generated by excitation of the fluorescent material. The program causes the processor to execute: in a first observation mode, controlling a rotation operation of the fluorescent material to set such that an imaging period in which the fluorescence reflected from a subject is captured by an imager and a first period in which an area without the optical filter is positioned at an irradiation position at which the excitation light is irradiated to the fluorescent material overlap, the first observation mode being a normal observation mode to observe the subject by using the fluorescence that has been generated upon the excitation of the fluorescent material and that has not passed through the optical filter; and lighting the light source in a second period in which the imaging period and the first period overlap.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4 is a diagram illustrating transmittance character-istics of a first optical filter;

FIG. 5 is a diagram illustrating a second rotation unit;

FIG. 8 is a time chart explaining a first observation mode;

FIG. 10 is a time chart explaining a third observation mode;

FIG. 11 is a time chart explaining a fourth observation mode;

FIG. 12 is a time chart explaining a fifth observation mode;

FIG. 16 is a time chart explaining the first observation mode;

FIG. 18 is a time chart explaining the second observation mode;

FIG. 21 is a time chart explaining the first observation mode;

FIG. 22 is a time chart explaining the second observation mode;

FIG. 23 is a time chart explaining the third observation mode;

FIG. 24 is a time chart explaining the fourth observation mode;

FIG. 25 is a time chart explaining the fifth observation mode;

FIG. 26 is a time chart explaining a sixth observation mode;

FIG. 27 is a time chart explaining a first observation mode according to a fourth embodiment;

FIG. 33 is a diagram illustrating a modification of the first to the fourth embodiments.

DETAILED DESCRIPTION

Hereinafter, forms to implement the disclosure (hereinaf-ter, embodiments) will be explained with reference to the drawings. Note that the embodiments explained below are not intended to limit the disclosure. Furthermore, in descrip-tion of the drawings, same reference signs are assigned to same components.

First Embodiment

Configuration of Endoscope System

Figure 1:
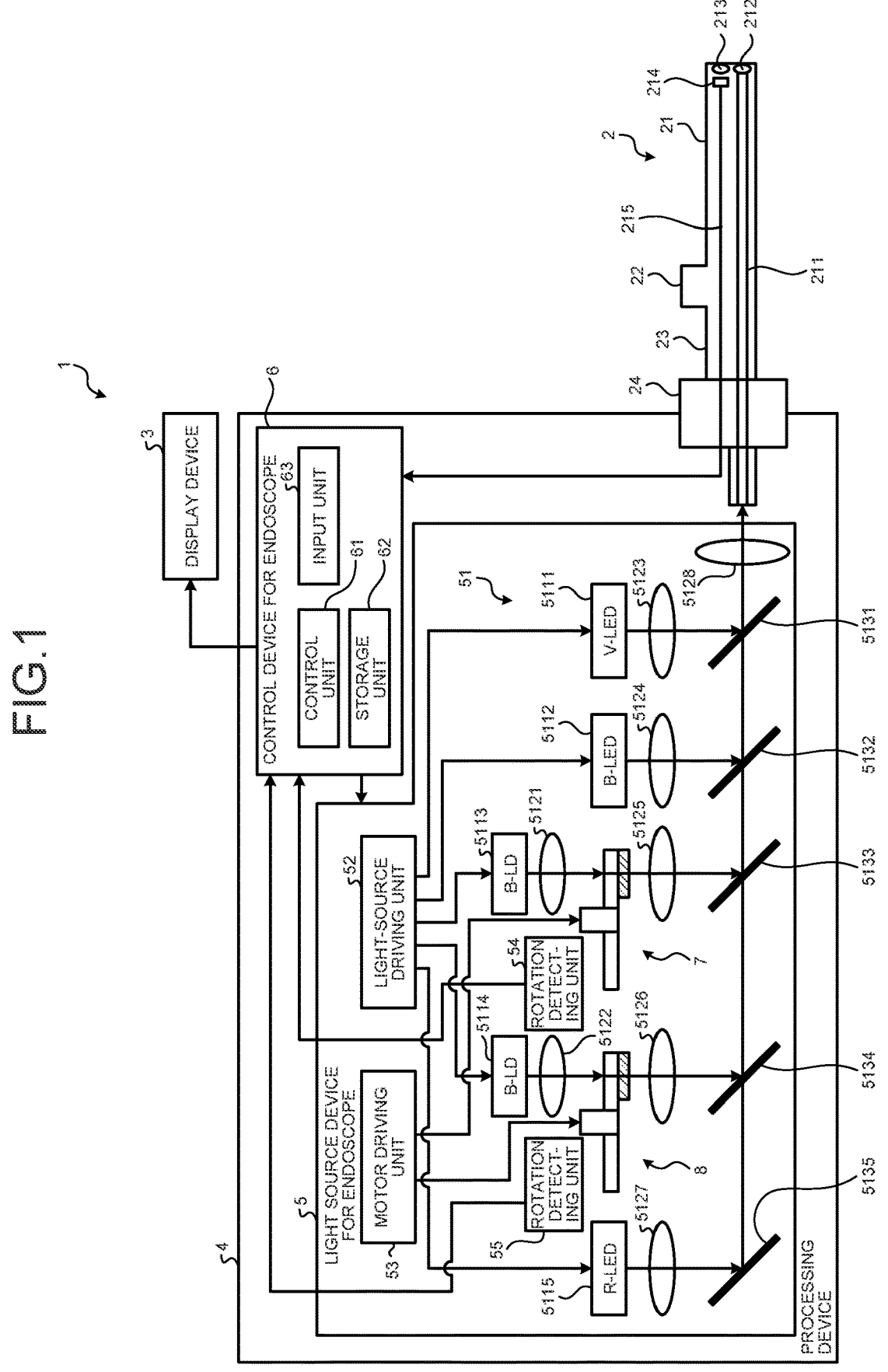
FIG. 1 is a diagram illustrating a configuration of an endoscope system according to a first embodiment.

FIG. 1 is a diagram illustrating a configuration of an endoscope system 1 according to a first embodiment.

The endoscope system 1 is used, for example, in a medical field, and is a system to observe the inside of a subject (inside a living body). This endoscope system 1 includes, as illustrated in FIG. 1, an endoscope 2, a display device 3, and a processing device 4.

The endoscope 2 is partially inserted in a living body, and images a subject image that is reflected from the inside of the living body, and outputs an image signal generated by this imaging. This endoscope 2 includes, as illustrated in FIG. 1, an insertion portion 21, an operating unit 22, a universal cord 23, and a connector portion 24.

The insertion portion 21 has flexibility in at least a part thereof, and is a portion that is inserted into the inside of a living body. In this insertion portion 21, a light guide 211, an illumination lens 212, an objective lens 213, an imager 214, and a signal line 215 are arranged.

The light guide 211 is drawn from the insertion portion 21 through the operating unit 22 and the universal cord 23 to the connector portion 24. One end of the light guide 211 is positioned at a distal end portion in the insertion portion 21. Moreover, in a state in which the endoscope 2 is connected to the processing device 4, the other end of the light guide 211 is positioned inside the processing device 4. The light guide 211 transmits light supplied from a light source device 5 for an endoscope in the processing device 4 to one end from the other end.

The illumination lens 212 faces one end of the light guide 211 in the insertion portion 21. The illumination lens 212 irradiates the light transmitted by the light guide 211 to the inside of a living body.

The objective lens 213 is arranged at the distal end portion in the insertion portion 21. The objective lens 213 forms an image of the light irradiated to the inside of the living body from the illumination lens 212 and reflected from the inside of the living body (subject image) on the imager 214.

The imager 214 images the subject image formed by the objective lens 213. The imager 214 outputs an image signal acquired by the imaging. This imager 214 can be exempli-fied by a charge coupled device (CCD), which is a global shutter imager that converts light of a subject image into an electrical signal upon reception thereof, a complementary metal oxide semiconductor (CMOS), which is a rolling shutter imager, and the like. In the first embodiment, the imager is composed of a CMOS.

The signal line 215 is drawn from the insertion portion 21 through the operating unit 22 and the universal cord 23 to the connector portion 24. One end of the signal line 215 is electrically connected to the imager 214. Moreover, in a state in which the endoscope 2 is connected to the processing device 4, the other end of the signal line 215 is electrically connected to a control device 6 for an endoscope in the processing device 4. The signal line 215 transmits a control signal output from the control device 6 for an endoscope and an image signal output from the imager 214.

The operating unit 22 is connected to a proximal end portion of the insertion portion 21. The operating unit 22 accepts various kinds of operations with respect to the endoscope 2.

The universal cord 23 extends in a direction different from an extension direction of the insertion portion 21 from the operating unit 22, and is a cord in which the light guide 211, the signal line 215, and the like are arranged.

The connector portion 24 is arranged at an end portion of the universal cord 23, and is detachably connected to the processing device 4.

The display device 3 is a liquid crystal display (LCD), an electroluminescence (EL) display, or the like, and displays an image based on an image signal subjected to image processing by the processing device 4, and the like.

The processing device 4 corresponds to a light source device. This processing device 4 includes, as illustrated in FIG. 1, the light source for an endoscope, and the control device 6 for an endoscope. In the first embodiment, the light source device 5 for an endoscope and the control device 6 for an endoscope are arranged in a single casing as the processing device 4, but not limited thereto, the light source device 5 for an endoscope and the control device for an endoscope may be arranged separately in different casings.

The light source device 5 for an endoscope emits plural kinds of illumination light respectively having wavelength bands different from one another under control of the control device 6 for an endoscope. This light source device 5 for an endoscope includes, as illustrated in FIG. 1, a light source unit 51, a light-source driving unit 52, a motor driving unit 53, and rotation detecting units 54 and 55.

The light source unit 51 is a portion that irradiates plural kinds of illumination light having wavelength bands different from one another. This light source unit 51 includes, as illustrated in FIG. 1, a first to a fifth light sources 5111 to 5115, a first and a second rotation units 7 and 8, a first to an eighth lenses 5121 to 5128, and a first to a fifth dichroic mirrors 5131 to 5135.

The first light source 5111 emits violet light (for example, light having a wavelength band of 400 nm to 440 nm).

The second light source 5112 emits blue light (for example, light having a wavelength band of 440 nm to 500 nm).

The third light source 5113 emits blue light (for example, light having a wavelength band of 440 nm to 460 nm). This third light source 5113 corresponds to a light source and a first excitation light source. Moreover, the blue light corresponds to the excitation light.

The fourth light source 5114 emits blue light (for example, light having a wavelength band of 440 nm to 460 nm). This fourth light source 5114 corresponds to the light source and a second excitation light source. Moreover, the blue light corresponds to the excitation light.

The fifth light source 5115 emits red light (for example, light having a wavelength band of 620 nm to 650 nm).

The first to the fifth light sources 5111 to 5115 are composed of an LED or a laser diode (LD). In the first embodiment, the first, the second, and the fifth light sources 5111, 5112, and 5115 are composed of an LED. Furthermore, the third and the fourth light sources 5113 and 5114 are composed of an LD. In FIG. 1, the first light source 5111 is denoted as "V-LED", the second light source 5112 is denoted as "B-LED), the third and the fourth light sources

5113 and 5114 are denoted as "B-LD", and the fifth light source 5115 is denoted as "R-LED" for convenience of explanation.

Figure 2:
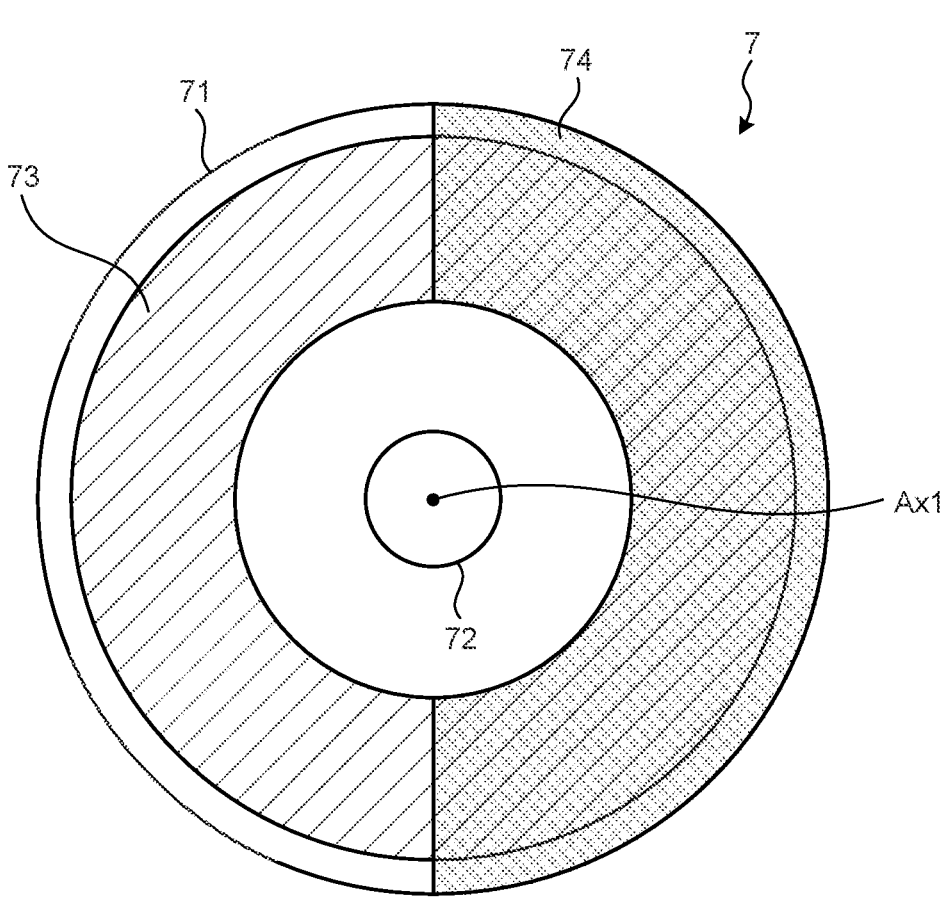
FIG. 2 is a diagram illustrating a first rotation unit.
Figure 3:
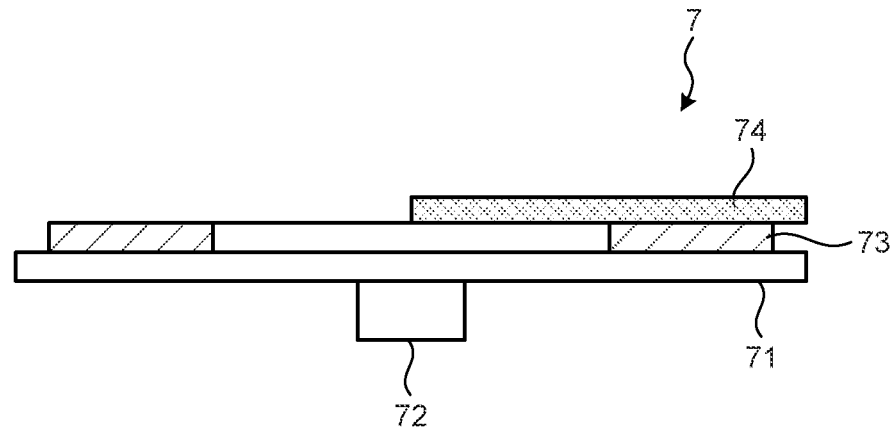
FIG. 3 is a diagram illustrating the first rotation unit.

FIG. 2 and FIG. 3 are diagrams illustrating a first rotation unit 7. Specifically, FIG. 2 is a diagram illustrating the first rotation unit 7 when viewed from a direction along a first center axis Ax1. FIG. 3 is a diagram illustrating the first rotation unit 7 when viewed from a direction perpendicular to the first center axis Ax1. In FIG. 2 and FIG. 3, a first fluorescent material 73 is represented by diagonal lines, and a first optical filter 74 is represented by dots for convenience of explanation.

The first rotation unit 7 is a portion that converts blue light emitted from the third light source 5113 and gathered by the first lens 5121 into a first green light or a second green light. This first rotation unit 7 includes, as illustrated in FIG. 2 or FIG. 3, a first rotator 71, a first rotation motor 72, the first fluorescent material 73, and the first optical filter 74.

The first rotator 71 has a disc shape composed of a transparent material, such as glass. Moreover, the first rotator 71 is arranged in such a position that one planar surface faces to the third light source 5113. The first rotator 71 is configured to be rotatable about the first center axis Ax1. The first center axis Ax1 is a center axis of the disc in the first rotator 71 in a disc shape, and corresponds to a rotation axis and a first rotation axis.

The first rotation motor 72 corresponds to a driving source. The first rotation motor 72 rotates the first rotator 71 about the first center axis Ax1 at a rotation frequency according to a driving signal from the motor driving unit 53.

The first fluorescent material 73 corresponds to a fluorescent material. This first fluorescent material 73 is a fluorescent material applied to the first rotator 71 on a planar surface on the opposite side of the third light source 5113, and has a ring shape about the first center axis Ax1. That is, the first fluorescent material 73 rotates about the first center axis Ax1 together with the first rotator 71. The first fluorescent material 73 emits fluorescent light (first green light) of a wavelength band of green (for example, wavelength band of 500 nm to 580 nm) upon reception of blue light (excitation light) that is emitted by the third light source 5113 and gathered by the first lens 5121. The first green light corresponds to first fluorescent light.

Figures 4, 5:
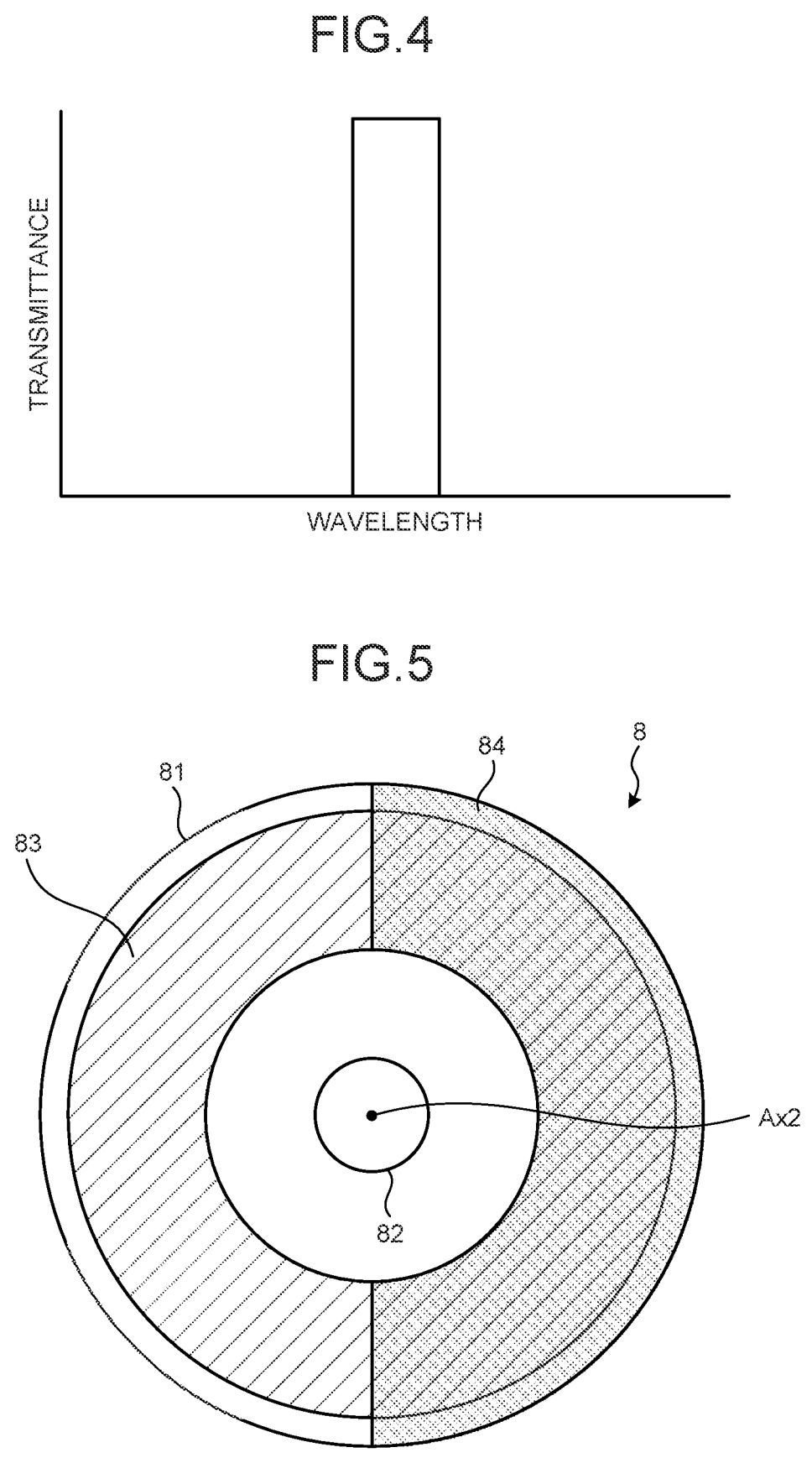

FIG. 4 is a diagram illustrating a transmittance characteristic of the first optical filter 74. Specifically, in FIG. 4, a horizontal axis represents wavelength and a vertical axis represents transmittance.

The first optical filter 74 is, for example, a glass plate on which a dielectric coating is applied, and is arranged so as to cover a part of the first fluorescent material 73 from the direction along the first center axis Ax1. In the first embodiment, the first optical filter 74 has a shape extending by 180° of rotation angle (half ring shape) along the rotation direction about the first center axis Ax1 as illustrated in FIG. 2. Furthermore, the first optical filter 74 covers a half of the first fluorescent material 73 in an intimate state attached to the first fluorescent material 73 in the direction along the first center axis Ax1 as illustrated in FIG. 3. That is, the first fluorescent material 73 and the first optical filter 74 rotate in an integrated manner about the first center axis Ax1 together with the first rotator 71, rotated by a single unit of the first rotation motor 72. The first optical filter 74 passes fluorescent light (second green light) of a part of wavelength band (for example, a wavelength band of 530 nm to 550 nm (refer to FIG. 4)) in of fluorescent light (first green light) that is generated as the first fluorescent material 73 is excited.

Figure 6:
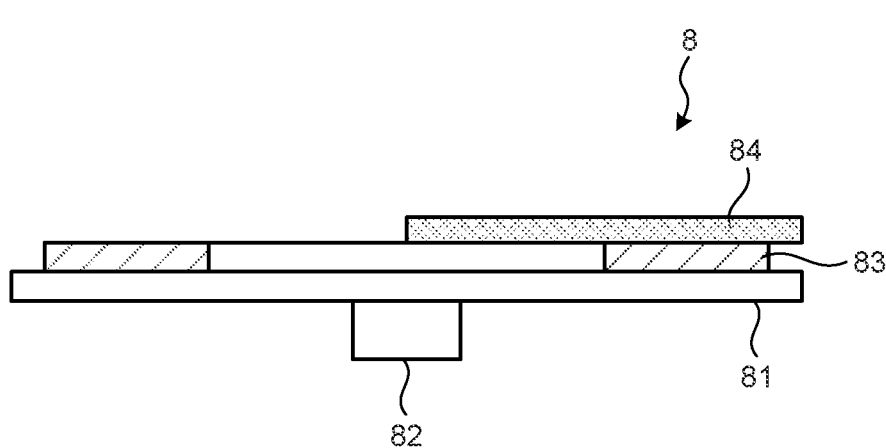
FIG. 6 is a diagram illustrating the second rotation unit.

FIG. 5 and FIG. 6 are diagrams illustrating a second rotation unit 8. Specifically, FIG. 5 is a diagram illustrating the second rotation unit 8 when viewed from a direction along a second center axis Ax2. FIG. 6 is a diagram illustrating the second rotation unit 8 when viewed from a direction perpendicular to the second center axis Ax2. In FIG. 5, a second fluorescent material 83 is represented by diagonal lines, and a second optical filter 84 is represented by dots for convenience of explanation.

The second rotation unit 8 is a portion that converts blue light emitted from the fourth light source 5114 and gathered by the second lens 5122 into first amber light or second amber light. This second rotation unit 8 includes, as illustrated in FIG. 5 or FIG. 6, a second rotator 81, a second rotation motor 82, the second fluorescent material 83, and the second optical filter 84.

The second rotator 81 has a disc shape composed of a transparent material, such as glass. Moreover, the second rotator 81 is arranged in such a position that one planar surface faces to the fourth light source 5114. The second rotator 81 is configured to be rotatable about the second center axis Ax2. The second center axis Ax2 is a center axis of the disc in the second rotator 81 in a disc shape, and corresponds to a rotation axis and a second rotation axis.

The second rotation motor 82 corresponds to a driving source. The second rotation motor 82 rotates the second rotator 81 about the second center axis Ax2 at a rotation frequency according to a driving signal from the motor driving unit 53.

The second fluorescent material 83 corresponds to a fluorescent material. This second fluorescent material 83 is a fluorescent material applied to the second rotator 81 on a planar surface on the opposite side of the fourth light source 5114, and has a ring shape about the second center axis Ax2. That is, the second fluorescent material 83 rotates about the second center axis Ax2 together with the second rotator 81. The second fluorescent material 83 emits fluorescent light (first amber light) of a wavelength band of amber (for example, wavelength band of 580 nm to 620 nm) upon reception of blue light (excitation light) that is emitted by the fourth light source 5114 and gathered by the second lens 5122. The first amber light corresponds to second fluorescent light.

Figure 7:
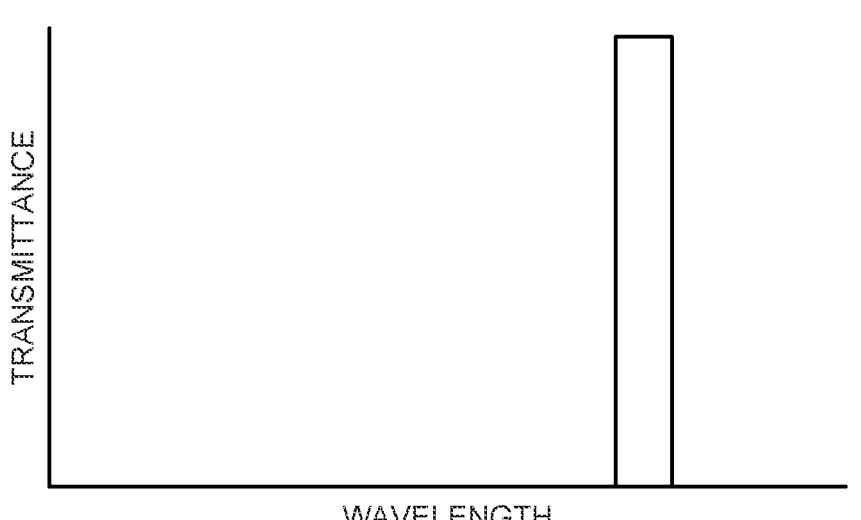
FIG. 7 is a diagram illustrating transmittance character-istics of a second optical filter.

FIG. 7 is a diagram illustrating a transmittance characteristic of the second optical filter 84. Specifically, in FIG. 7, a horizontal axis represents wavelength and a vertical axis represents transmittance.

The second optical filter 84 is, for example, a glass plate on which a dielectric coating is applied, and is arranged so as to cover a part of the second fluorescent material 83 from the direction along the second center axis Ax2. In the first embodiment, the second optical filter 84 has a shape extending by 180° of rotation angle (half ring shape) along the rotation direction about the second center axis Ax2 as illustrated in FIG. 5. Furthermore, the second optical filter 84 covers a half of the second fluorescent material 83 in an intimate state of attached to the second fluorescent material 83 in the direction along the second center axis Ax2 as illustrated in FIG. 6. That is, the second fluorescent material 83 and the second optical filter 84 rotate in an integrated manner about the second center axis Ax1 together with the second rotator 81, rotated by a single unit of the second rotation motor 82. The second optical filter 84 passes fluorescent light (second amber light) of a part of wavelength band (for example, a wavelength band of 590 nm to 610 nm (refer to FIG. 7) in fluorescent light (first amber light) that is generated as the second fluorescent material 83 is excited.

The first to the fifth dichroic mirrors 5131 to 5135 bend lights from the first to the fifth light sources 5111 to 5115, to make then respectively travel on the same optical axis.

Specifically, the first dichroic mirror 5131 bends violet light that is emitted from the first light source 5111 and gathered by the third lens 5123, and passes light of wavelength bands other than the violet light.

The second dichroic mirror 5132 bends blue light that is emitted from the second light source 5112 and gathered by the fourth lens 5124, and passes light of wavelength bands other than the blue light.

The third dichroic mirror 5133 bends the first green light or the second green light that is emitted from the first rotation unit 7 and gathered by the fifth lens 5125, and passes light of wavelength bands other than the first green light.

The fourth dichroic mirror 5134 bends the first amber light or the second amber light that is emitted from the second rotation unit 8 and gathered by the sixth lens 5126, and passes light of wavelength bands other than the first amber light.

The fifth dichroic mirror 5135 bends red light that is emitted from the fifth light source 5115 and gathered by the seventh lens 5127, and passes light of wavelength bands other than the red light.

The eighth lens 5128 gathers the violet light, the blue light, the first and the second green lights, the first and the second amber lights, and the red light that have traveled through the first to the fifth dichroic mirrors 5131 to 5135, and guides them to the other end of the light guide 211.

The lights emitted from first, the second, and the fifth light sources 5111, 5112, and 5115, and the first and the second fluorescent materials 73 and 83 may be a light having a wider wavelength range than the wavelength ranges described above. That is, by reflecting light having a predetermined wavelength range in the light having the wider wavelength range, and by passing unnecessary wavelength components by the first to the fifth dichroic mirrors 5131 to 5135, light of a predetermined wavelength is entered to the other end of the light guide 211.

The light-source driving unit 52 respectively drives the first to the fifth light sources 5111 to 5115 under control of the control device 6 for an endoscope.

The motor driving unit 53 outputs a driving signal to rotate the first and the second rotators 71 and 82 at a specific rotation frequency to the first and the second rotation motors 72 and 82, respectively under control of the control device 6 for an endoscope.

The rotation detecting unit 54 is constituted of, for example, a photo reflector. The rotation detecting unit 54 detects a rotation position of the first rotator 71 and a rotation position of the first optical filter 74, and outputs a first-rotator position signal according to the rotation position of the first rotator 71 and a first-optical-filter position signal according to the rotation position of the first optical filter 74 to the control device 6 for an endoscope.

In the first embodiment, the first-rotator position signal is output from the rotation detecting unit 54 once every rotation of the first rotator 71 about the center axis Ax1.

Moreover, in the first embodiment, the first-optical-filter position signal is output from the rotation detecting unit 54 when it switches from an area in which the first optical filter 74 is present to an area in which it is not present, and when it switches from the area in which the first optical filter 74 is not present to the area in which it is present, at an irradiation position of blue light (excitation light) that is emitted from the third light source 5113 to the first rotation unit 7 while the first rotator 71 is rotating about the first center axis Ax1. That is, the first-optical-filter position signal is output from the rotation detecting unit 54 twice every rotation of the first rotator 71 about the first center axis Ax1.

The rotation detecting unit 55 is constituted of, for example, a photo reflector. The rotation detecting unit 55 detects a rotation position of the second rotator 81 and a rotation position of the second optical filter 84, and outputs a second-rotator position signal according to the rotation position of the second rotator 81 and a second-optical-filter position signal according to the rotation position of the second optical filter 84 to the control device 6 for an endoscope.

In the first embodiment, the second-rotator position signal is output from the rotation detecting unit 55 once every rotation of the second rotator 81 about the center axis Ax1.

Moreover, in the first embodiment, the second-optical-filter position signal is output from the rotation detecting unit 55 when it switches from an area in which the second optical filter 84 is present to an area in which it is not present, and when it switches from the area in which the second optical filter 84 is not present to the area in which it is present, at an irradiation position of blue light (excitation light) that is emitted from the fourth light source 5114 to the second rotation unit 8 while the second rotator 81 is rotating about the second center axis Ax2. That is, the second-optical-filter position signal is output from the rotation detecting unit 55 twice every rotation of the second rotator 81 about the second center axis Ax2.

The control device 6 for an endoscope comprehensively controls operation of the entire endoscope system 1. This control device 6 for an endoscope includes, as illustrated in FIG. 1, a control unit 61, a storage unit 62, and an input unit 63.

The control unit 61 corresponds to a processor. This control unit 61 is constituted of a central processing unit (CPU), a field-programmable gate array (FPGA), or the like, and controls operation of the entire endoscope system 1 in according to a program stored in the storage unit 62. Functions of the control unit 61 will be explained in "Control Method" described later.

The storage unit 62 stores various kinds of programs (including a control program) executed by the control unit 61, information necessary for processing of the control unit 61, and the like.

The input unit 63 is constituted of a keyboard, a mouse, a switch, and a touch panel, and accepts a user operation. The input unit 63 outputs an operation signal according to the user operation to the control unit 61.

Control Method

Next, the control method performed by the control unit 61 will be explained.

The control unit 61 performs different processing according to the first to the fifth observation modes. In the following, the violet light, the blue light, the first and the second green lights, the first and the second amber lights, and the red light emitted from the light source device 5 for an endoscope to the other end of the light guide will be denoted as violet light V, blue light B, first and second lights G1 and G2, first and second amber lights A1 and A2, and red light R, respectively for convenience of explanation.

The first observation mode is an observation mode in which an inside of a living body is observed using white light obtained by combining the violet light V, the blue light B, the first green light G1, the first amber light A1, and the red light R (normal observation).

The second observation mode is an observation mode in which an inside of a living body is observed using light obtained by combining the second green light G2 and the violet light V (NBI observation). The NBI observation corresponds to a special light observation.

The third observation mode is an observation mode in which the normal observation and the NBI observation are performed at the same time.

The fourth observation mode is an observation mode in which an inside of a living body is observed using light obtained by combining the second green light G2, the second amber light A2, and the red light R (red dichromatic imaging (RDI) observation). The RDI observation corresponds to a special light observation.

the fifth observation mode is an observation mode in which the normal observation and the RDI observation are performed at the same time.

The control unit 61 switches to either one of the first to the fifth observation modes according to, for example, a user operation made with respect to the input unit 63.

Hereinafter, processing of the control unit 61 in the first to the fifth observation modes will be sequentially explained.

First Observation Mode

First, processing of the control unit 61 in the first observation mode will be explained.

Figure 8:
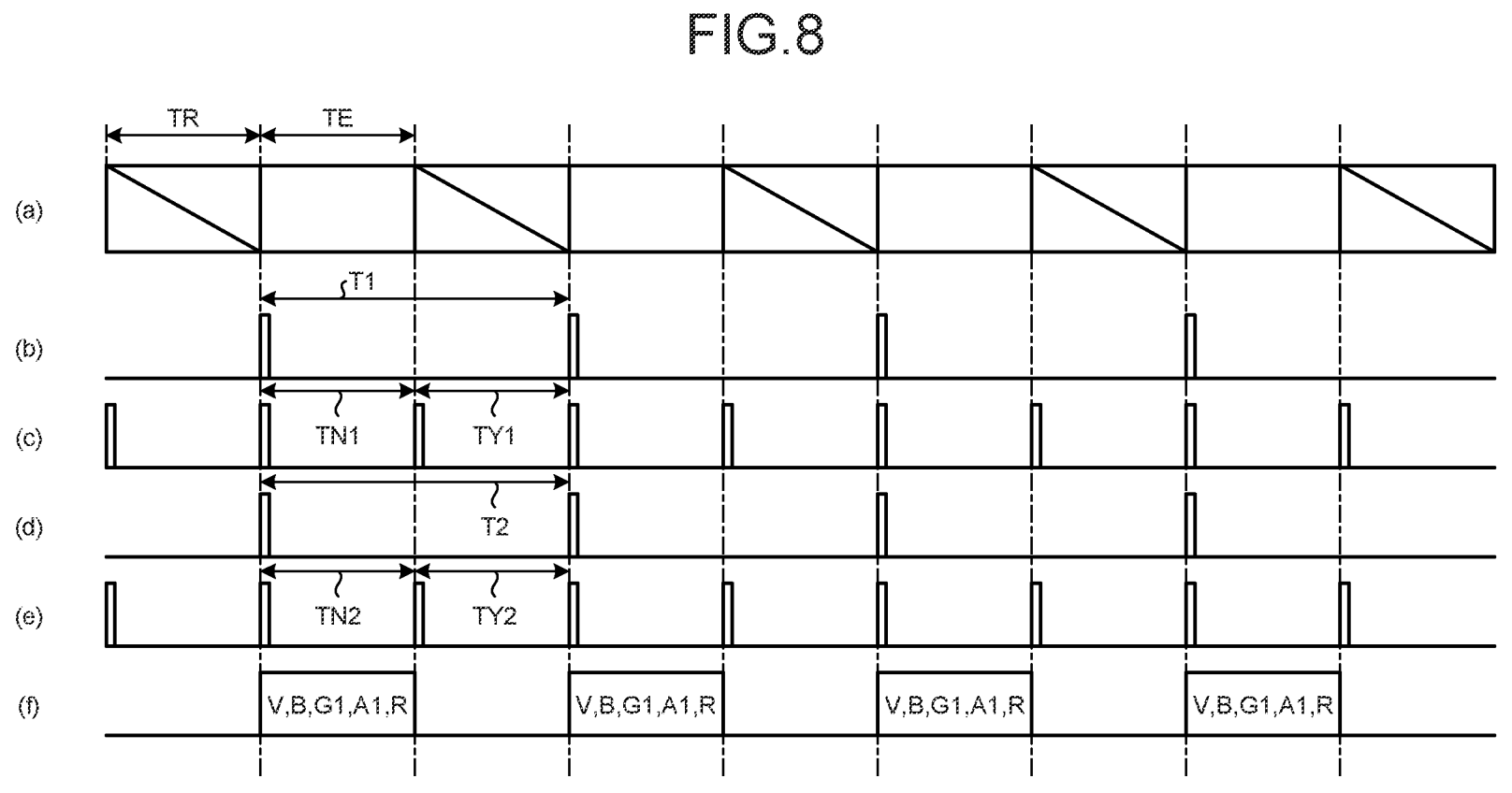

FIG. 8 is a time chart explaining the first observation mode. Specifically, (a) in FIG. 8 is a diagram illustrating exposure timing of the imager 214, and a vertical axis represents a horizontal line of the imager 214 (the top row represents the uppermost horizontal line (the first horizontal line), and the bottom row represents the lowermost horizontal line (the last line), and a horizontal axis represents time. (b) in FIG. 8 shows the first-rotator position signal. (c) in FIG. 8 shows the first-optical-filter position signal. (d) in FIG. 8 shows the second-rotator position signal. (e) in FIG. 8 shows the second-optical-filter position signal. (f) in FIG. 8 shows light emitting timing of the first to the fifth light sources 5111 to 5115. In (f) in FIG. 8, for convenience of explanation, "V" is assigned when light emitted from the light source device 5 for an endoscope to the other end of the light guide 211 is the violet light V, "B" is assigned when it is the blue light B, "G1" is assigned when it is the first green light G1, "G2" is assigned when it is the second green light G2, "A1" is assigned when it is the first amber light "A1", "A2" is assigned when it is the second amber light A2, and "R" is assigned when it is the red light R.

The control unit 61 controls the imager 214 as described below.

The control unit 61 performs an exposure control by the rolling shutter method in which exposure during one-frame period of the imager 214 is started sequentially for each horizontal line, and readout is performed sequentially for each line that has exposed for a predetermined period of time (so-called, shutter speed) since the start of exposure. In the first embodiment, the control unit 61 performs the exposure control, as illustrated in (a) in FIG. 8, in such a manner that an all-line exposure period TE in which all of the horizontal lines of the imager 214 are exposed at the same time and a readout time TR in which charge carriers accumulated in plural pixels of the imager 214 are read out constitute the one-frame period. The all-line exposure period TE corresponds to an imaging period.

Moreover, the control unit 61 operates the first rotator 71 by controlling the motor driving unit 53 as described below.

The control unit 61 sets such that a rotation period T1 of the first rotator 71 rotating about the first center axis Ax1 is the same period as the one-frame period of the imager 214 as illustrated in (b) in FIG. 8 based on the first-rotator position signal. Furthermore, the control unit 61 sets such that a first filter-absent period TN1 coincides with the all-line exposure period TE as illustrated in (c) in FIG. 8 based on the first-optical-filter position signal. In other words, the control unit 61 sets a first filter-present period TY1 coincides with the readout period TR based on the first-optical-filter position signal.

The first filter-absent period TN1 is a period in which the area without the first optical filter 74 is positioned at the irradiation position of blue light (excitation light) that is emitted from the third light source 5113 to the first rotation unit 7 when the first rotator 71 is rotating about the first center axis Ax1. Moreover, the first filter-present period TY1 is a period in which the area with the first optical filter 74 is positioned at the irradiation position when the first rotator 71 is rotating about the first center axis Ax1.

Moreover, the control unit 61 operates the second rotator 81 by controlling the motor driving unit 53 as described below.

The control unit 61 sets such that a rotation period T2 of the second rotator 81 rotating about the second center axis Ax1 is same as the one-frame period of the imager 214 as illustrated in (d) in FIG. 8 based on the second-rotator position signal. Furthermore, the control unit 61 sets such that a second filter-absent period TN2 coincides with the first filter-absent period TN1 as illustrated in (e) in FIG. 8 based on the second-optical-filter position signal. In other words, the control unit 61 sets such that a second filter-present period TY2 coincides with the first filter-present period TY1 based on the first-optical-filter position signal. That is, the control unit 61 sets phases in the rotation periods T1 and T2 of the first and the second rotators 71 and 81 to be the same.

The second filter-absent period TN2 is a period in which the area without the second optical filter 84 is positioned at the irradiation position of blue light (excitation light) that is emitted from the fourth light source 5114 to the second rotation unit 8 when the second rotator 81 is rotating about the center axis Ax2. Moreover, the second filter-present period TY2 is a period in which the area with the second optical filter 84 is positioned at the irradiation position of blue light (excitation light) that is emitted from the fourth light source 5114 to the second rotation unit 8 when the second rotator 81 is rotating about the second center axis Ax2.

Moreover, the control unit 61 lights the first to the fifth light sources 5111 to 5115 by controlling the light-source driving unit 52 as described below.

The control unit 61 lights the first to the fifth light sources 5111 to 5115 in the first and the second filter-absent periods TN1 and TN2 as illustrated in (f) in FIG. 8. Thus, the light source device 5 for an endoscope emits white light in which the violet light V, the blue light B, the first green light G1, the first amber light A1, and the red light R are combined to the other end of the light guide 211 in the first and the second filter-absent periods TN1 and TN2 (all line exposure period TE). The white light is irradiated to the inside of a living body, and the imager 214 captures white light (subject image) reflected from the inside of the living body. Moreover, the control unit 61 performs predetermined image processing with respect to an image signal (white light image) output from the imager 214, and causes the display device 3 to display a white light image subjected to the image processing.

Second Observation Mode

Next, processing of the control unit 61 in the second observation mode will be explained.

Figure 9:
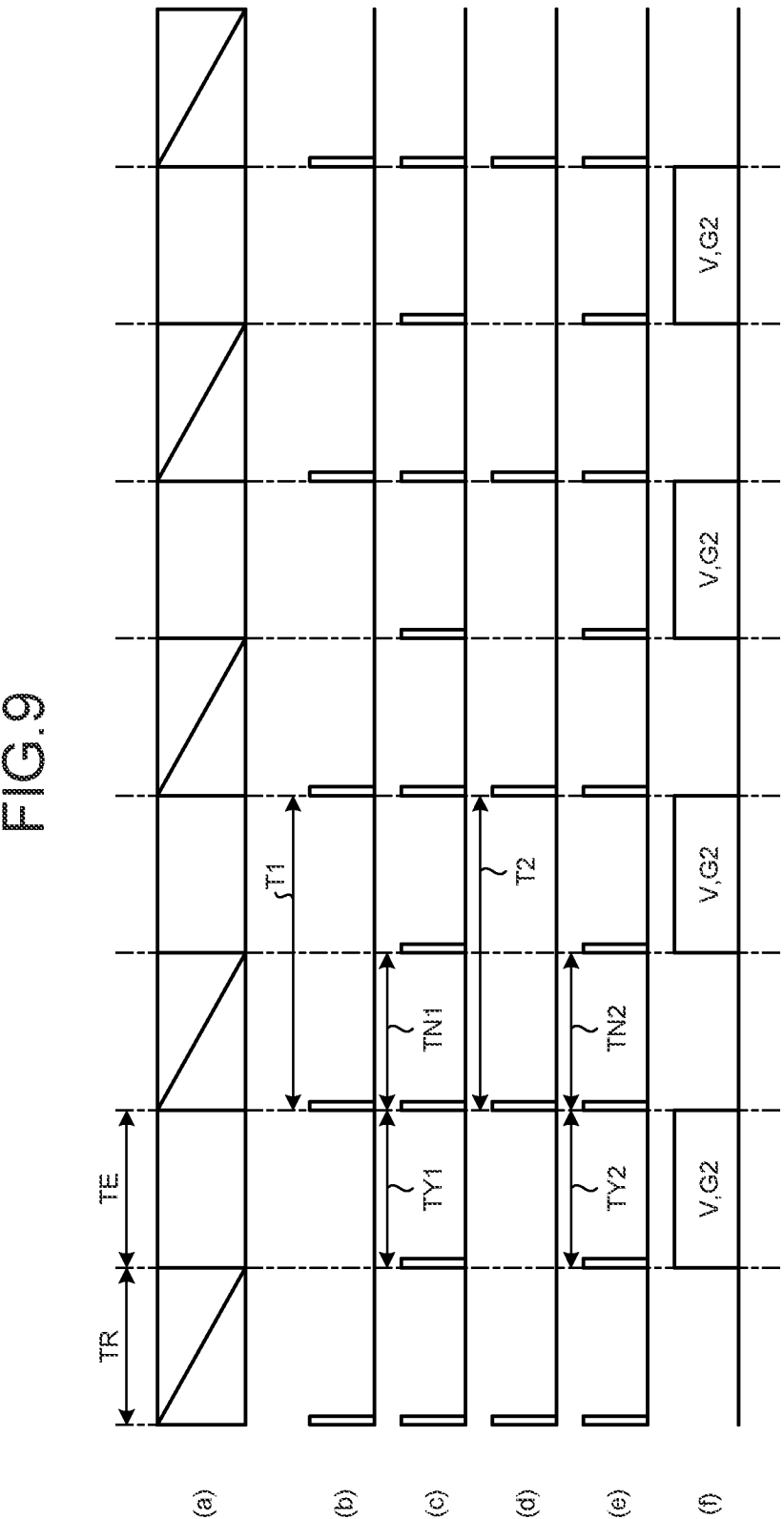
FIG. 9 is a time chart explaining a second observation mode.

FIG. 9 is a time chart explaining the second observation mode. Specifically, (a) in FIG. 9 to (f) in FIG. 9 are diagrams corresponding to (a) in FIG. 8 to (f) in FIG. 8, respectively.

As illustrated in (a) in FIG. 9, the control unit 61 controls the imager 214 similarly to the first observation mode illustrated in (a) in FIG. 8.

Furthermore, the control unit 61 operates the first rotator 71 by controlling the motor driving unit 53 as described below.

The control unit 61 sets such that the rotation period T1 of the first rotator 71 is same as the one-frame period of the imager 214 as illustrated in (b) in FIG. 9 based on the first-rotator position signal. Furthermore, the control unit 61 sets such that the first filter-present period TY1 coincides with the all-line exposure period TE as illustrated in (c) in FIG. 9 based on the first-optical-filter position signal. In other words, the control unit 61 sets such that a first filter-absent period TN1 coincides with the readout period TR based on the first-optical-filter position signal.

Moreover, the control unit 61 operates the second rotator 81 by controlling the motor driving unit 53 as described below.

The control unit 61 sets such that the rotation period T2 of the second rotator 81 is the same period as the one-frame period of the imager 214 as illustrated in (d) in FIG. 9 based on the second-rotator position signal. Furthermore, the control unit 61 sets such that the second filter-present period TY2 coincides with the first filter-present period TY1 as illustrated in (e) in FIG. 9 based on the second-optical-filter position signal. In other words, the control unit 61 sets such that a second filter-absent period TN2 coincides with the first filter-absent period TN1 based on the first-optical-filter position signal. That is, the control unit 61 sets phases in the rotation periods T1 and T2 of the first and the second rotators 71 and 81 to be the same.

The control unit 61 lights the first and the third light sources 5111 and 5113 by controlling the light-source driving unit 52 as described below.

The control unit 61 lights the first and the third light sources 5111 and 5113 in the first and the second filter-present periods TY1 and TY2 as illustrated in (f) in FIG. 9. Thus, the light source device 5 for an endoscope emits light in which the violet light V and the second greenlight G2 are combined to the other end of the light guide 211 in the first and the second filter-present periods TY1 and TY2 (all-line exposure period TE). The light is irradiated to the inside of a living body, and the imager 214 captures the light (subject image) reflected from the inside of the living body. Moreover, the control unit 61 performs predetermined image processing with respect to an image signal (NBI image) output from the imager 214, and causes the display device 3 to display an NBI image subjected to the image processing.

Third Observation Mode

Next, the processing of the control unit 61 in the third observation mode will be explained.

Figure 10:
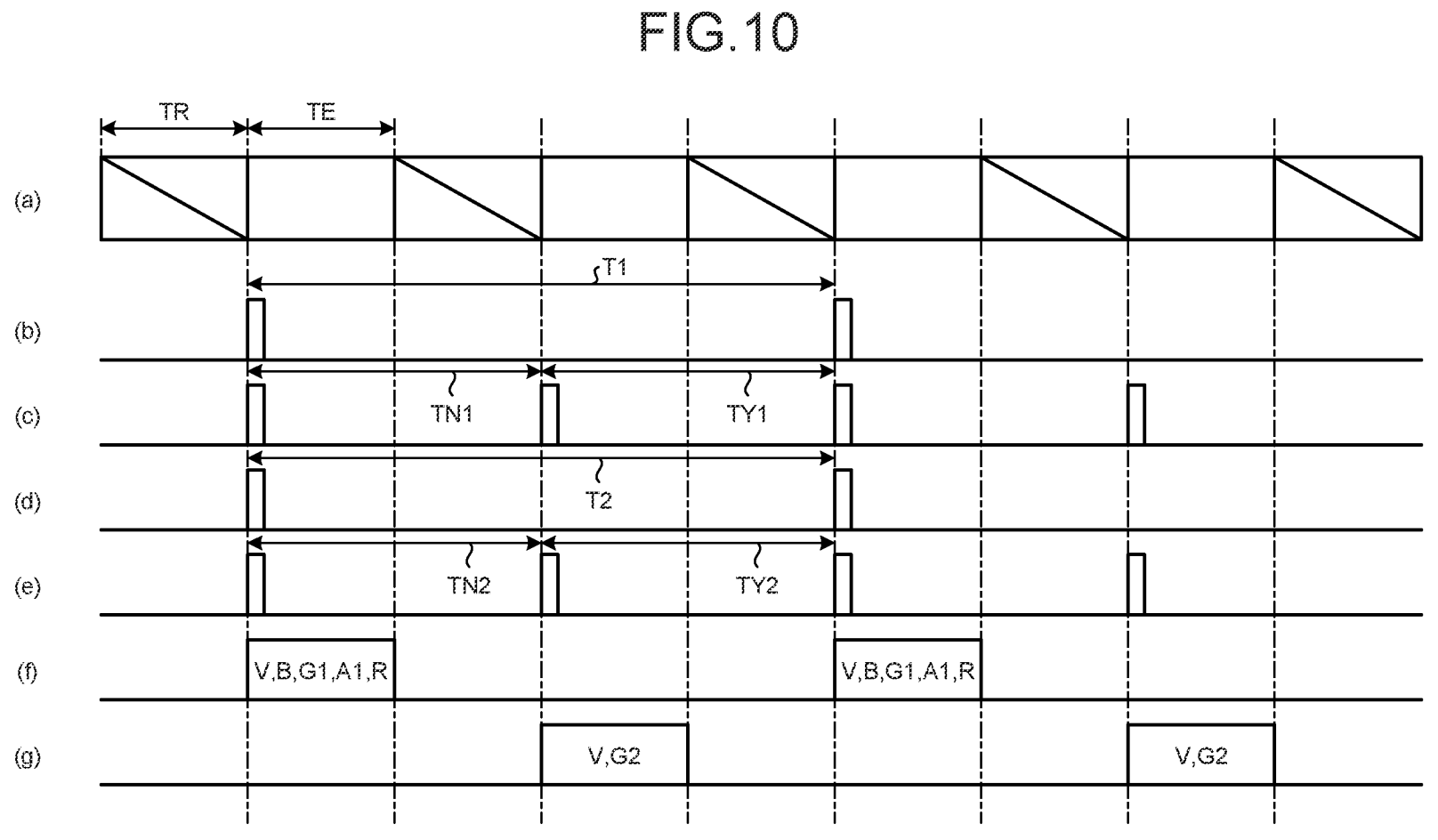

FIG. 10 is a time chart explaining the third observation mode. Specifically, (a) in FIG. 10 to (e) in FIG. 10 are diagrams corresponding to (a) in FIG. 8 to (e) in FIG. 8, respectively. (f) in FIG. 10 and (g) in FIG. 10 are diagrams corresponding to (f) in FIG. 8.

As illustrated in (a) in FIG. 10, the control unit 61 controls the imager 214 similarly to the first observation mode illustrated in (a) in FIG. 8.

Furthermore, the control unit 61 operates the first rotator 71 by controlling the motor driving unit 53 as described below.

The control unit 61 sets such that the rotation period T1 of the first rotator 71 is the same period as two-frame period of the imager 214 as illustrated in (b) in FIG. 10 based on the first-rotator position signal. Furthermore, the control unit 61 sets such that the first filter-absent period TN1 coincides with two periods TE and TR that are continuous in the order of the all-line exposure period TE and the readout period TR as illustrated in (c) in FIG. 10 based on the first-optical-filter position signal. In other words, the control unit 61 sets such that the first filter-present period TY1 coincides with the two periods TE and TR that are continuous in the order of the all-line exposure period TE and the readout period TR based on the first-optical-filter position signal.

Moreover, the control unit 61 operates the second rotator 81 by controlling the motor driving unit 53 as described below.

The control unit 61 sets such that the rotation period T2 of the second rotator 81 is the same period as the two-frame period of the imager 214 as illustrated in (d) in FIG. 10 based on the second-rotator position signal. Furthermore, the control unit 61 sets such that the second filter-absent period TN 2 coincides with the first filter-absent period TN1 as illustrated in (e) in FIG. 10 based on the second-optical-filter position signal. In other words, the control unit 61 sets such that the second filter-present period TY2 coincides with the first filter-present period TY1 based on the second-optical-filter position signal. That is, the control unit 61 sets such that phases in the rotation periods T1 and T2 of the first and the second rotators 71 and 81 are the same.

The control unit 61 lights the first to the fifth light sources 5111 to 5115 by controlling the light-source driving unit 52 as described below.

The control unit 61 lights the first to the fifth light sources 5111 to 5115 in the all-line exposure period TE of the first and the second filter-absent periods TN1 and TN2 as illustrated in (f) in FIG. 10. Thus, the light source device 5 for an endoscope emits white light in which the violet light V, the blue light B, the first green light G1, the first amber light A1, and the red light R are combined to the other end of the light guide 211 in the all-line exposure period TE of the first and the second filter-absent periods TN1 and TN2. The white light is irradiated to the inside of a living body, and the imager 214 captures white light (subject image) reflected from the inside of the living body. Moreover, the control unit 61 performs predetermined image processing with respect to an image signal (white light image) output from the imager 214.

Furthermore, the control unit 61 lights the first and the third light sources 5111 and 5113 in the all-line exposure period TE of the first and the second filter-present periods TY1 and TY2 as illustrated in (g) in FIG. 10. Thus, the light source device 5 for an endoscope emits light in which the violet light V and the second green light G2 are combined to the other end of the light guide 211 in the all-line exposure period TE of the first and the second filter-present periods TY1 and TY2. The light is irradiated to the inside of a living body, and the imager 214 captures the light (subject image) reflected from the inside of the living body. Moreover, the control unit 61 performs predetermined image processing with respect to an image signal (NBI image) output from the imager 214.

The control unit 61 then causes the display device 3 to display the white light image subjected to the image processing and the NBI image subjected to the image processing in an aligned manner, or in a superimposed manner.

Fourth Observation Mode

Next, processing of the control unit 61 in the fourth observation mode will be explained.

Figure 11:
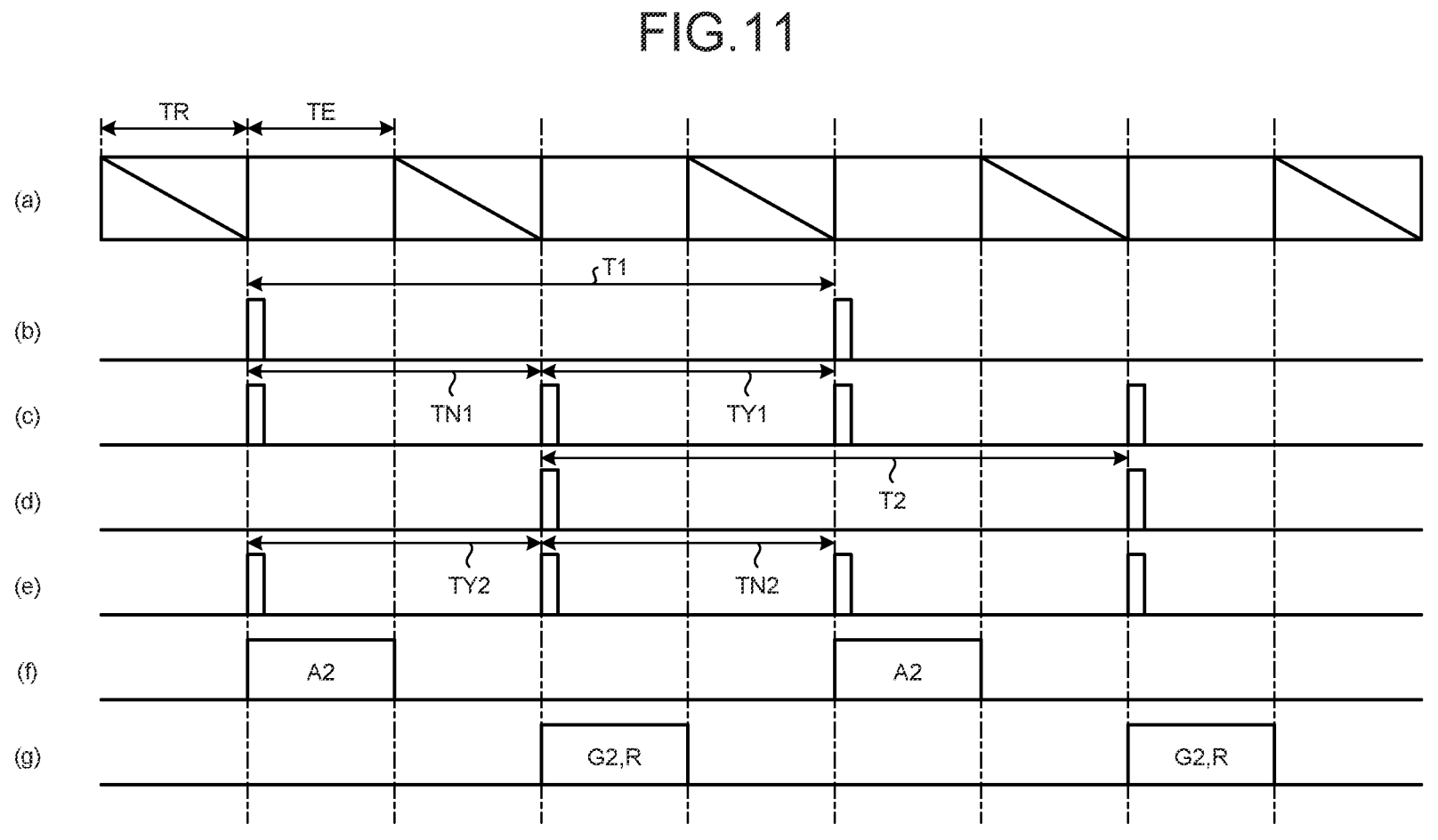

FIG. 11 is a time chart explaining the fourth observation mode. Specifically, (a) in FIG. 11 to (e) in FIG. 11 are diagrams corresponding to (a) in FIG. 8 to (e) in FIG. 8, respectively. (f) in FIG. 11 and (g) in FIG. 11 are diagrams corresponding to (f) in FIG. 8.

As illustrated in (a) in FIG. 11, the control unit 61 controls the imager 214 similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as the two-frame period of the imager 214 as illustrated in (b) in FIG. 11 based on the first-rotator position signal. Furthermore, the control unit 61 sets such that the first filter-absent period TN1 coincides with the two periods TE and TR that are continuous in the order of the all-line exposure period TE and the readout period TR as illustrated in (c) in FIG. 11 based on the first-optical-filter position signal. In other words, the control unit 61 sets such that the first filter-present period TY1 coincides with the two periods TE and TR that are continuous in the order of the all-line exposure period TE and the readout period TR based on the first-optical-filter position signal.

Moreover, the control unit 61 operates the second rotator 81 by controlling the motor driving unit 53 as described below.

The control unit 61 sets such that the rotation period T2 of the second rotator 81 is the same period as the two-frame period of the imager 214 as illustrated in (d) in FIG. 11 based on the second-rotator position signal. Furthermore, the control unit 61 sets such that the second filter-present period TY2 coincides with the first filter-absent period TN1 as illustrated in (e) in FIG. 11 based on the second-optical-filter position signal. In other words, the control unit 61 sets such that the second filter-absent period TN2 coincides with the first filter-present period TY1 based on the second-optical-filter position signal. That is, the control unit 61 shifts the phases in the rotation periods T1 and T2 of the first and the second rotators 71 and 81 by 180°.

The control unit 61 lights the third to the fifth light sources 5113 to 5115 by controlling the light-source driving unit 52 as described below.

The control unit 61 lights the fourth light source 5114 in the all-line exposure period TE of the first filter-absent period TN1 and the second filter-present period TY2 as illustrated in (f) in FIG. 11. Thus, the light source device 5 for an endoscope emits the second amber light A2 to the other end of the light guide 211 in the all-line exposure period TE of the first filter-absent period TN1 and the second filter-present period TY2. The amber light A2 is irradiated to the inside of the living body, and the imager 214 captures the second amber light A2 (subject image) reflected from the inside of the living body. Moreover, the control unit 61 performs predetermined image processing with respect to an image signal (image based on the second amber light A2) output from the imager 214.

Furthermore, the control unit 61 lights the third and the fifth light sources 5113 and 5115 in the all-line exposure period of the first filter-present period TY1 and the second filter-absent period TN2 as illustrated in (g) in FIG. 11. Thus, the light source device 5 for an endoscope emits light in which the second green light G2 and the red light R are combined to the other end of the light guide 211 in the all-line exposure period of the first filter-present period TY1 and the second filter-absent period TN2. The light is irradiated to the inside of the living body, and the imager 214 captures the light (subject image) reflected from the inside of the living body. Moreover, the control unit 61 performs predetermined image processing with respect to an image signal (image based on the second green light G2 and the red light R) output from the imager 214.

The control unit 61 then generates an RDI image from the image based on the second amber light A2 subjected to the image processing and the image based on the second green light G2 and the red light R subjected to the image processing, and causes the display device 3 to display the RDI image.

Fifth Observation Mode

Next, processing of the control unit 61 in the fifth observation mode will be explained.

Figure 12:
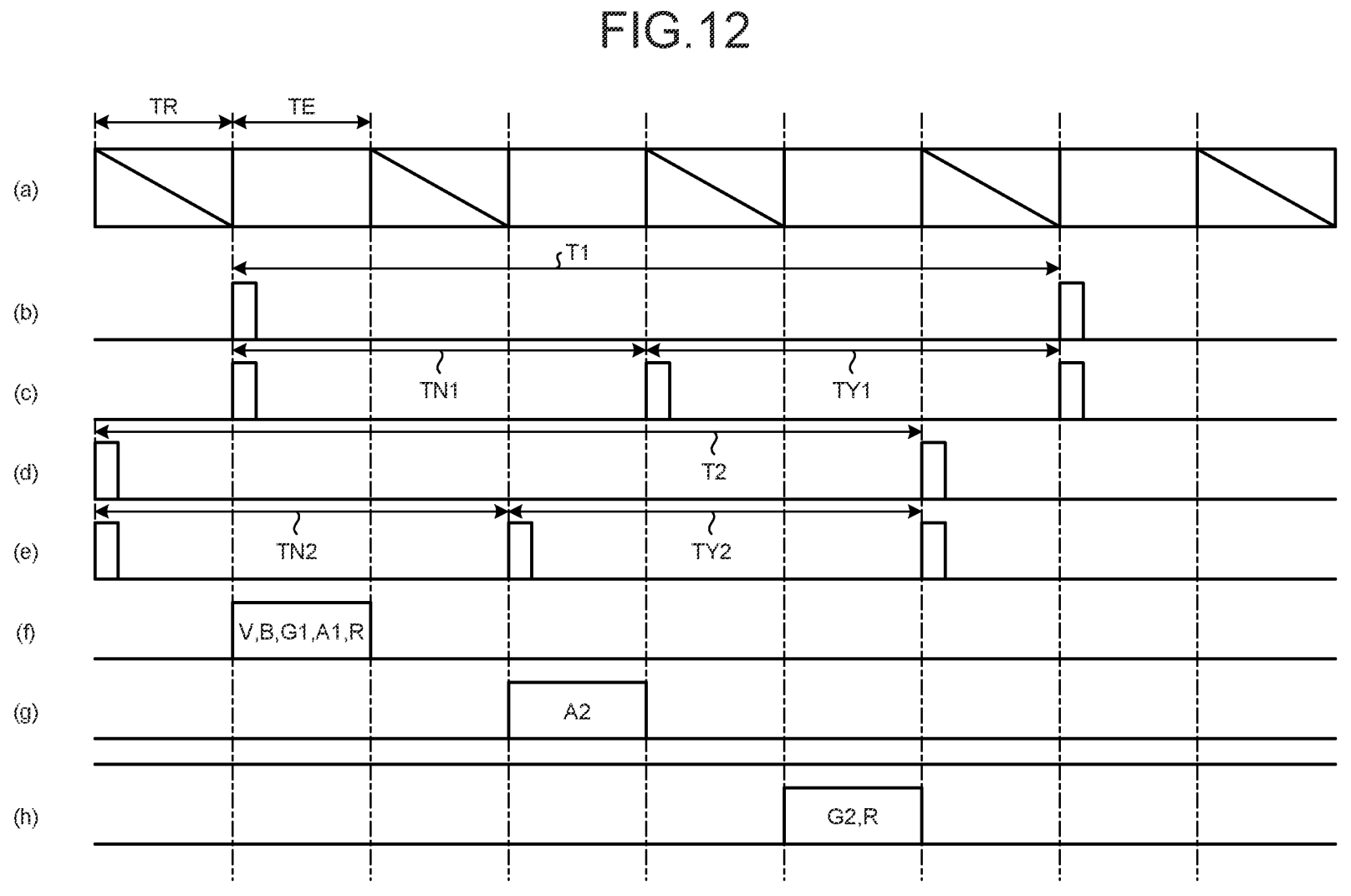

FIG. 12 is a time chart explaining the fifth observation mode. Specifically, (a) in FIG. 12 to (e) in FIG. 12 are diagrams corresponding to (a) in FIG. 8 to (e) in FIG. 8, respectively. (f) in FIG. 12 to (h) in FIG. 12 are diagrams corresponding to (f) in FIG. 8.

As illustrated in (a) in FIG. 12, the control unit 61 controls the imager 214 similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a three-frame period of the imager 214 as illustrated in (b) in FIG. 12 based on the first-rotator position signal. Furthermore, the control unit 61 sets such that the first filter-absent period TN1 coincides with three periods TE, TR, and TE that are continuous in the order of the all-line exposure period TE, the readout period TR, and the all-line exposure period TE as illustrated in (c) in FIG. 12 based on the first-optical-filter position signal. In other words, the control unit 61 sets such that the first filter-present period TY1 coincides with three periods TR, TE, and TR that are continuous in the order of the readout period TR, the all-line exposure period TE, and the readout period TR based on the first-optical-filter position signal.

Furthermore, the control unit 61 operates the second rotator 81 by controlling the motor driving unit 53 as described below.

The control unit 61 sets such that the rotation period T2 of the second rotator 81 is the same period as a three-frame period of the imager 214 as illustrated in (d) in FIG. 12 based on the second-rotator position signal. Moreover, the control unit 61 sets such that the second filter-absent period TN2 coincides with three periods TR, TE, and TR that are continuous in the order of the readout period TR, the all-line exposure period TE, and the readout period TR as illustrated in (e) in FIG. 12 based on the second-optical-filter position signal. In other words, the control unit 61 sets such that the second filter-present period TY2 coincide with three periods TE, TR, and TE that are continuous sequentially in the order of the all-line exposure period TE, the readout period TR, and the all-line exposure period TE based on the first-optical-filter position signal. That is, the control unit 61 shifts the phases of the rotation periods T1 and T2 of the first and the second rotator 71 and 81 by 60°.

The control unit 61 then lights the first to the fifth light sources 5111 to 5115 by controlling the light-source driving unit 52 as described below.

The control unit 61 lights the first to the fifth light sources 5111 to 5115 in the all-line exposure period TE of the first and the second filter-absent period TN1 and the second filter-absent period TN2 as illustrated in (f) in FIG. 12. Thus, the light source device 5 for an endoscope emits white light in which the violet light V, the blue light B, the first green light G1, the first amber light A1, and the red light R are combined to the other end of the light guide 211 in the all-line exposure period TE of the first and the second filter-absent periods TN1 and TN2. The white light is irradiated to the inside of a living body, and the imager 214 captures white light (subject image) reflected from the inside of the living body. Moreover, the control unit 61 performs predetermined image processing with respect to an image signal (white light image) output from the imager 214.

Furthermore, the control unit 61 lights the fourth light source 5114 in the all-line exposure period TE of the first filter-absent period TN1 and the second filter-present periods TY2 as illustrated in (g) in FIG. 12. Thus, the light source device 5 for an endoscope emits the second amber light A2 to the other end of the light guide 211 in the all-line exposure period TE of the first filter-absent period TN1 and the second filter-present period TY2. The second amber light A2 is irradiated to the inside of a living body, and the imager 214 captures the second amber light A2 (subject image) reflected from the inside of the living body. Moreover, the control unit 61 performs predetermined image processing with respect to an image signal (image based on the second amber light A2) output from the imager 214.

Furthermore, the control unit 61 lights the third and the fifth light sources 5113 and 5115 in the all-line exposure period TE of the first and the second filter-present periods TY1 and TY2 as illustrated in (h) in FIG. 12. Thus, the light source device 5 for an endoscope emits light in which the second green light G2 and the red light R are combined to the other end of the light guide 211 in the all-line exposure period TE of the first and the second filter-present periods TY1 and TY2. The light is irradiated to the inside of the living body, and the imager captures the light reflected from the inside of the living body (subject image). Moreover, the control unit 61 performs predetermined image processing with respect to an image signal (image based on the second green light G2 and the red light R) output from the imager 214.

The control unit 61 generates an RDI image from the image based on the second amber light A2 subjected to the image processing and the image based on the second green light G2 and the red light R subjected to the image processing. Furthermore, the control unit 61 causes the display device 3 to display the white light image and the RDI image subjected to the image processing in an aligned manner or in a superimposed manner.

According to the first embodiment explained above, following effects are produced.

In the light source device 5 for an endoscope according to the first embodiment, the first fluorescent material 73 and the first optical filter 74 are rotated in an integrated manner about the first center axis Ax1 together with the first rotator 71 by a single unit of the first rotation motor 72. The second fluorescent material 83 and the second optical filter 84 are also rotated in an integrated manner about the second rotation axis Ax1 together with the second rotator 81 by a single unit of the second rotation motor 82.

Therefore, the rotation motor to be a driving source is only one unit each, and the device structure of the light source device 5 for an endoscope does not increase in size.

Furthermore, the control unit 61 lights the third light source 5113 in a period during which the all-line exposure period TE and the first filter-absent period TN1 overlap by controlling the rotation operation of the first rotator 71 in the first observation mode. The control unit 61 lights the third light source 5113 in a period during which the all-line exposure period TE and the first filter-present period TY1 overlap by controlling the rotation operation of the first rotator 71 in the second observation mode. Therefore, light of a wavelength band of green can be adjusted.

Moreover, the control unit 61 lights the fourth light source 5114 in a period during which the all-line exposure period TE and the second filter-absent period TN2 overlap by controlling the rotation operation of the second rotator 81 in the first observation mode. The control unit 61 lights the fourth light source 5114 in a period during which the all-line exposure period TE and the second filter-present period TY2 overlap by controlling the rotation operation of the second rotator 81 in the fourth observation mode. Therefore, light of a wavelength band of amber can be adjusted.

From the above, according to the first embodiment, light of a specific wavelength band (green light, amber light) can be adjusted without scaling up the device structure.

Particularly, the first optical filter 74 covers a part of the first fluorescent material 73 in an intimate state attached to the first fluorescent material 73 in the direction along the first center axis Ax1. Similarly, the second optical filter 84 also covers a part of the second fluorescent material 83 in an intimate state attached to the second fluorescent material 83 in the direction along the second center axis Ax1.

Therefore, there is no gap between the first optical filter 74 and the first fluorescent material 73, and it is thereby possible to reduce the size of the first rotation unit 7. Similarly, there is no gap between the second optical filter 84 and the second fluorescent material 83, and it is thereby possible to reduce the size of the second rotation unit 8.

Moreover, the control unit 61 sets such that the all-line exposure period TE overlaps with the first filter-absent period TN1 and with the first filter-present period TY1 alternately, by controlling the rotation operation of the first rotator 71 in the third observation mode. The control unit 61 lights the third light source 5113 in each of the period during which the all-line exposure period TE and the first filter-absent period TN1 overlap, and the period during which the all-line exposure period TE and the first filter-present period TY1 overlap.

Therefore, the normal observation and the NBI observation can be performed at the same time.

Furthermore, the control unit 61 can change the rotation periods T1 and T2 of the first and the second rotators 71 and 81, and phases in the rotation periods T1 and T2 by controlling the rotation operation of the first and the second rotators 71 and 81.

Therefore, all of the first to the fifth observation modes can be performed in a single unit of the endoscope system 1.

Second Embodiment

Next, a second embodiment will be explained.

In the following explanation, same reference signs are assigned to components similar to those of the first embodiment described above, and detailed explanation thereof is omitted or simplified.

Figure 13:
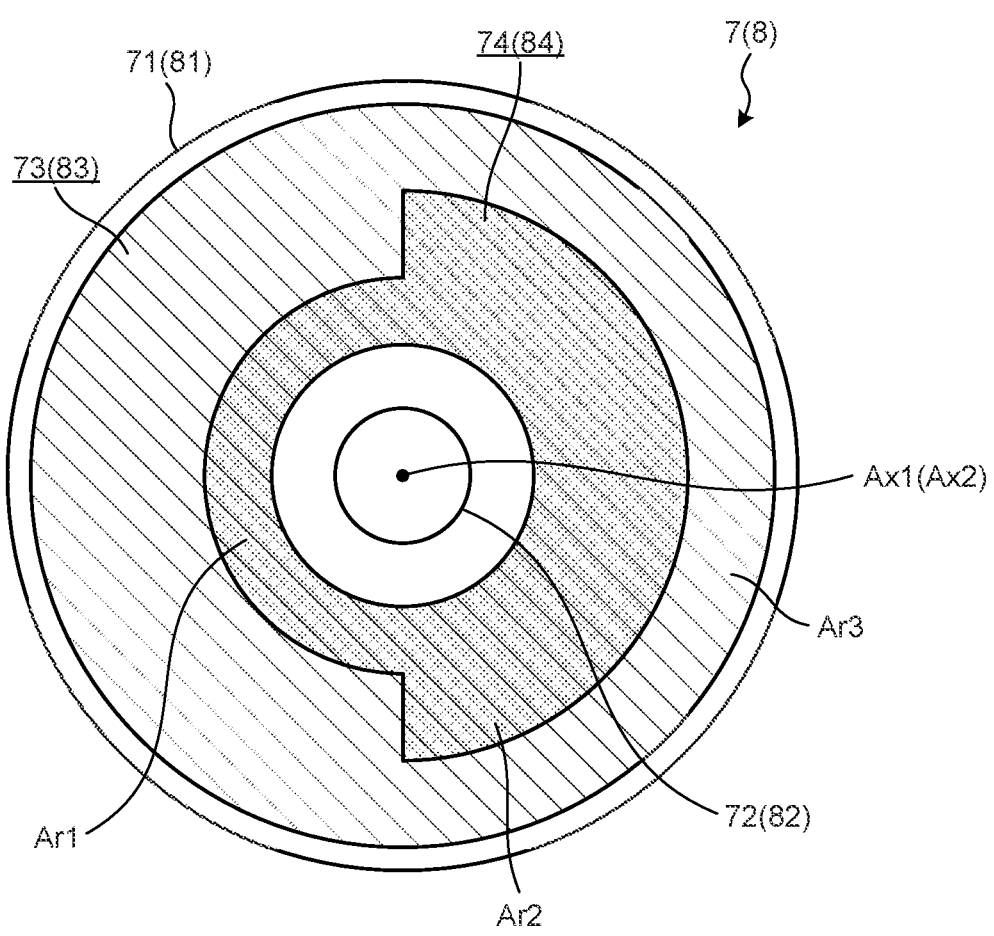
FIG. 13 is a diagram illustrating a first and a second rotation units according to the second embodiment.
Figure 14:
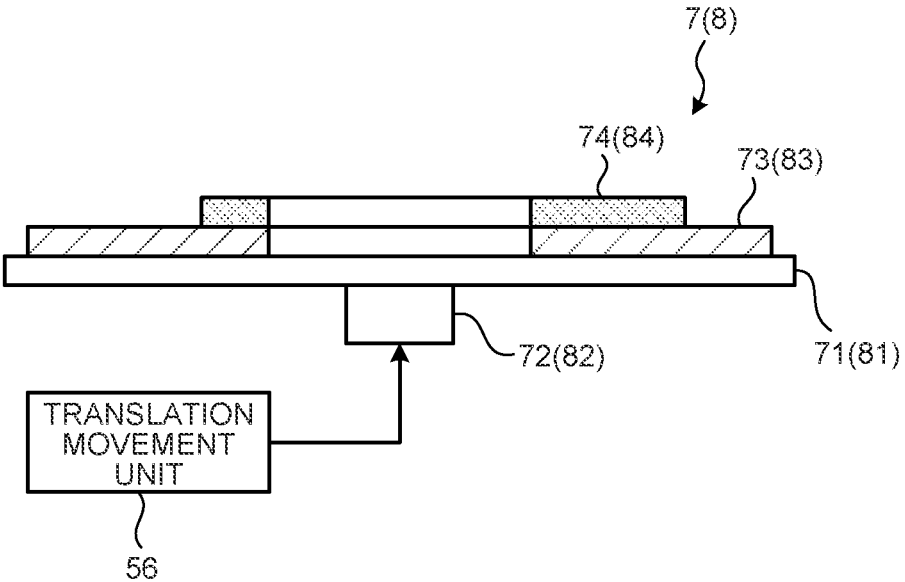
FIG. 14 is a diagram illustrating the first and the second rotation units according to the second embodiment.

FIG. 13 and FIG. 14 are diagrams illustrating the first and the second rotation units 7 and 8 according to the second embodiment. Specifically, FIG. 13 is a diagram corresponding to FIG. 2 and FIG. 5. FIG. 14 is a diagram corresponding to FIG. 3 and FIG. 6.

The first and the second rotation units 7 and 8 according to the second embodiment differs from the first and the second rotation units 7 and 8 explained in the first embodiment described above as illustrated in FIG. 13 or FIG. 14. Moreover, along with changes in the first and the second rotation units 7 and 8, processing performed by the control unit 61 is also different from the first embodiment described above.

The first and the second rotation units 7 and 8 according to the second embodiment have substantially the same configurations. Therefore, in the following, the first rotation unit 7 will be explained mainly. In FIG. 13 and FIG. 14, after reference signs indicating components of the first rotation unit 7, reference signs indicating components of the second rotation unit 8 substantially the same as the components of the first rotation unit 7 are given in brackets.

The first rotation unit 7 according to the second embodiment differs from the first rotation unit 7 explained in the first embodiment described above in a shape of the first optical filter 74.

Specifically, the first optical filter 74 has a first and a second areas Ar1 and Ar2 as illustrated in FIG. 13.

The first area Ar1 has a ring shape extending throughout the entire circumference in the direction of rotation about the first center axis Ax1. The first area Ar1 is arranged in an intimate state attached to the first fluorescent material 73 in the direction along the first center axis Ax1.

The second area Ar2 is arranged continuously to the first area Ar1 on an outer side in the radial direction in the first rotator 71. This second area Ar2 is arranged only in a part of the entire circumference in the direction of rotation about the first center axis Ax1. In the second embodiment, the second area Ar2 has a shape (half ring shape) that extends by 180° of the rotation angle along the direction of rotation about the first center axis Ax1. The second area Ar2 is arranged in an intimate state attached to the first fluorescent material 73 in the direction along the first center axis Ax1.

Moreover, on the outside of the second area Ar2 in the radial direction in the first rotator 71, the first fluorescent material 73 is not covered with the first optical filter 74 throughout the entire circumference in the direction of rotation about the first center axis Ax1. In the following, an area that is not covered with the first optical filter 74 throughout the entire circumference in the direction of rotation about the first center axis Ax1 in the first fluorescent material 73 is denoted as a third area Ar3 for convenience of explanation.

The first rotation unit 7 according to the second embodiment is configured to be able to position each of the first to the third areas Ar1 to Ar3 at the irradiation position of blue light (excitation light) emitted from the third light source 5113 to the first rotation unit 7 by a translation movement unit 56 as illustrated in FIG. 14. Specifically, the first rotation unit 7 according to the second embodiment is configured to be movable in left and right directions in FIG. 13 and FIG. 14.

A first-optical-filter position signal according to the second embodiment is output from the rotation detecting unit 54 when it switches from an area in which the second area Ar2 is present to an area in which it is not present, and when it switches from the area in which the second area Ar2 is not present to an area in which it is present at the irradiation position while the first rotator 71 is rotating about the first center axis Ax1 in a state in which the second area Ar2 is positioned at the irradiation position of blue light (excitation light) that is emitted from the third light source 5113 to the first rotation unit 7. Also in a state in which the first and the third area Ar1 and Ar3 are positioned at the irradiation position, the first-optical-filter position signal is output from the rotation detecting unit 54 at the rotation positions of the first rotator 71 described above. Moreover, as for a second-optical-filter position signal according to the second embodiment also, it is similar to the first-optical-filter position signal described above.

Next, a control method performed by the control unit 61 according to the second embodiment will be explained.

Hereinafter, processing of the control unit 61 in the first to the fifth observation modes will be explained sequentially.

First Observation Mode

First, processing of the control unit 61 in the first observation mode will be explained.

Figure 15:
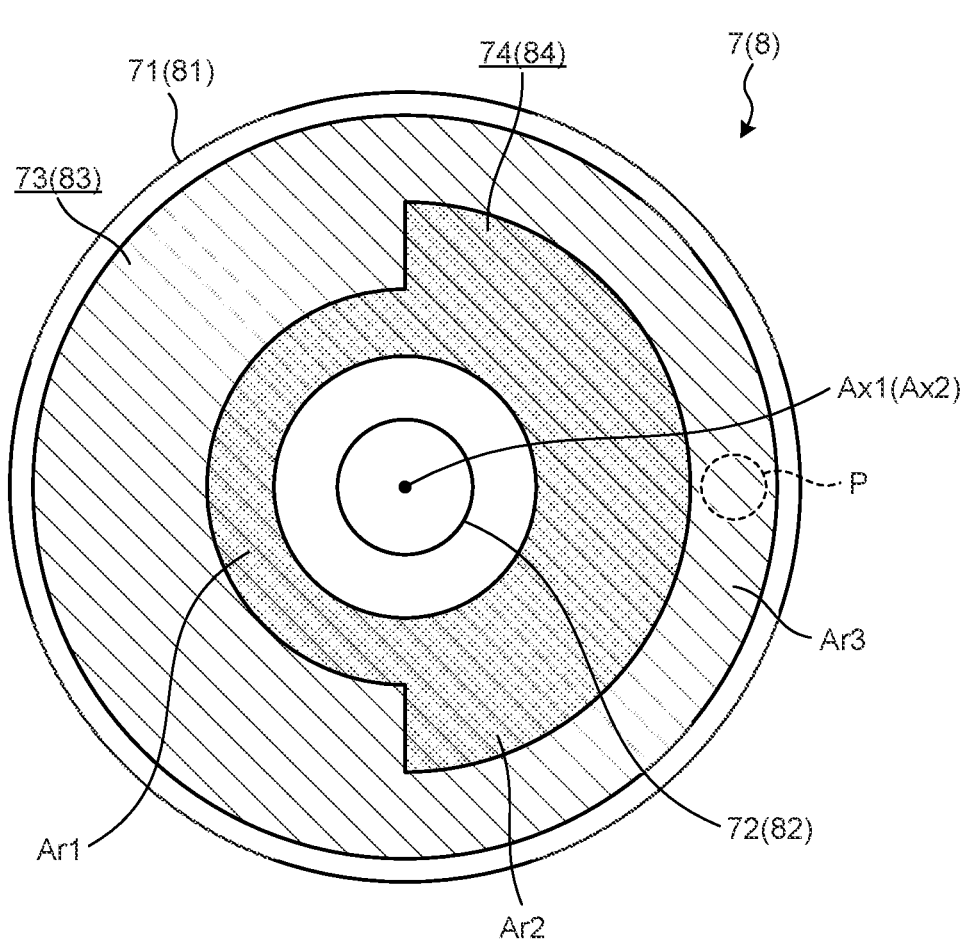
FIG. 15 is a diagram illustrating a state of the first and the second rotation units in the first observation mode.
Figure 16:
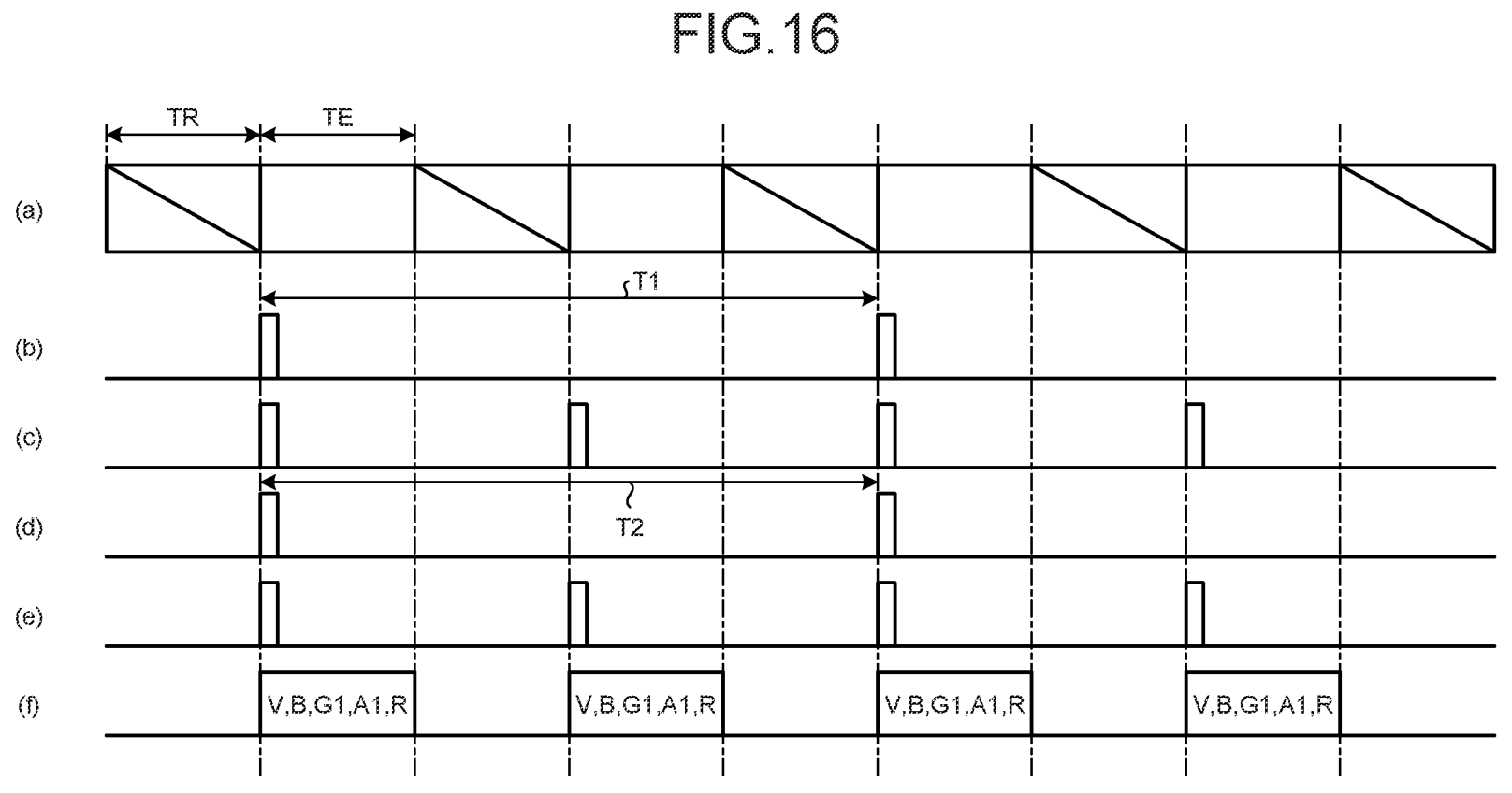

FIG. 15 is a diagram illustrating a state of the first and the second rotation units 7 and 8 in the first observation mode. Specifically, FIG. 15 is a diagram corresponding to FIG. 13. FIG. 16 is a time chart explaining the first observation mode. Specifically, (a) in FIG. 16 to (f) in FIG. 16 are diagrams corresponding to (a) in FIG. 8 to (f) in FIG. 8, respectively.

The control unit 61 positions the third area Ar3 at an irradiation position P of blue light (excitation light) emitted from the third light source 5113 (fourth light source 5114) to the first rotation unit 7 (second rotation unit 8) by controlling the translation movement unit 56 as illustrated in FIG. 15. Furthermore, the control unit 61 controls the imager 214 as illustrated in (a) in FIG. 16, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a two-frame period of the imager 214 based on the first-rotator position signal as illustrated in (b) in FIG. 16. Because the third area Ar3 is positioned at the irradiation position P, the first optical filter 74 is absent at the irradiation position P all the time when the first rotator 71 is rotating about the first center axis Ax1.

Furthermore, the control unit 61 operates the second rotator 81 by controlling the motor driving unit 53 as described below.

The control unit 61 sets such that the rotation period T2 of the second rotator 81 is the same as a two-frame period of the imager 214 based on the second-rotator position signal as illustrated in (d) in FIG. 16. Because the third area Ar3 is positioned at the irradiation position P, the second optical filter 84 is absent at the irradiation position P all the time when the second rotator 81 is rotating about the second center axis Ax1.

The control unit 61 lights the first to the fifth light sources 5111 to 5115 by controlling the light-source driving unit 52 as described below.

The control unit 61 lights the first to the fifth light sources 5111 to 5115 in the all-line exposure period TE as illustrated in (f) in FIG. 16. Thus, the light source device 5 for an endoscope emits white light in which the violet light V, the blue light B, the first green light G1, the first amber light A1, and the red light R are combined to the other end of the light guide 211 in the all-line exposure period TE. The white light is emitted to the inside of a living body, and the imager 214 captures white light (subject image) reflected from the inside of the living body. Moreover, the control unit 61 performs predetermined image processing with respect to an image signal (white light image) output from the imager 214, and causes the display device 3 to display a white light image subjected to the image processing.

Second Observation Mode

Next, processing of the control unit 61 in the second observation mode will be explained.

Figure 17:
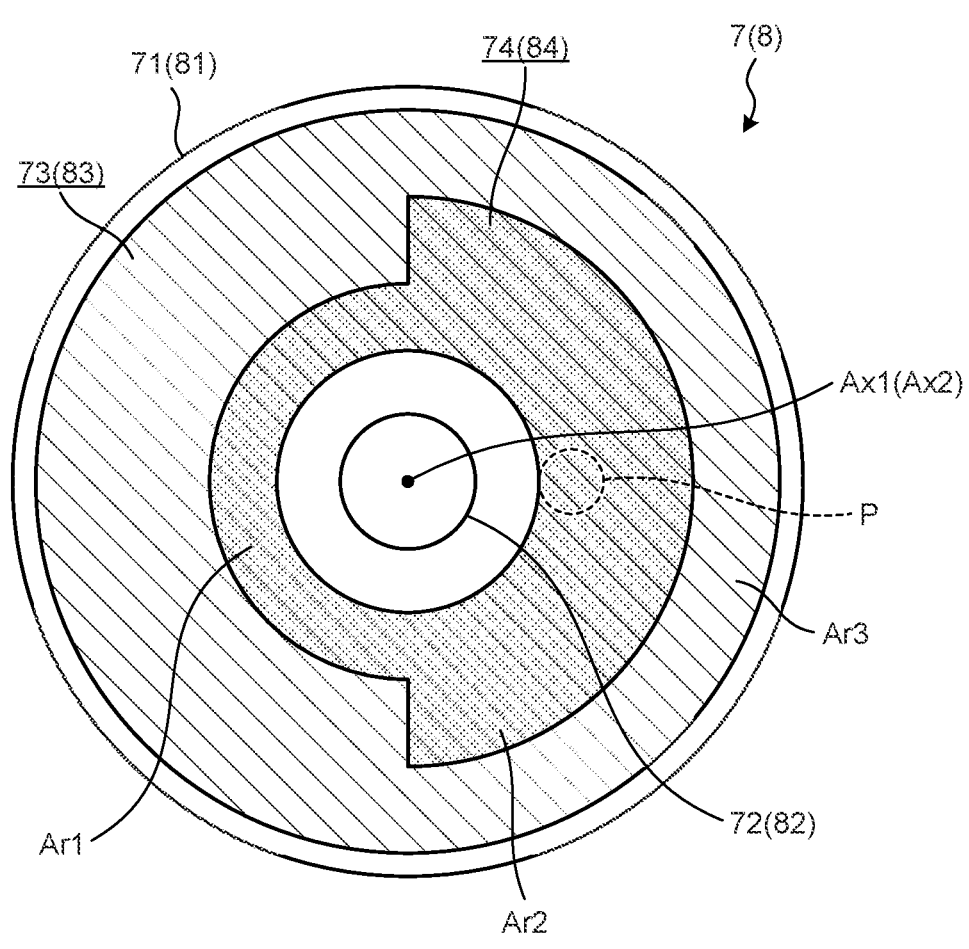
FIG. 17 is a diagram illustrating a state of the first and the second rotation units in the second observation mode.
Figure 18:
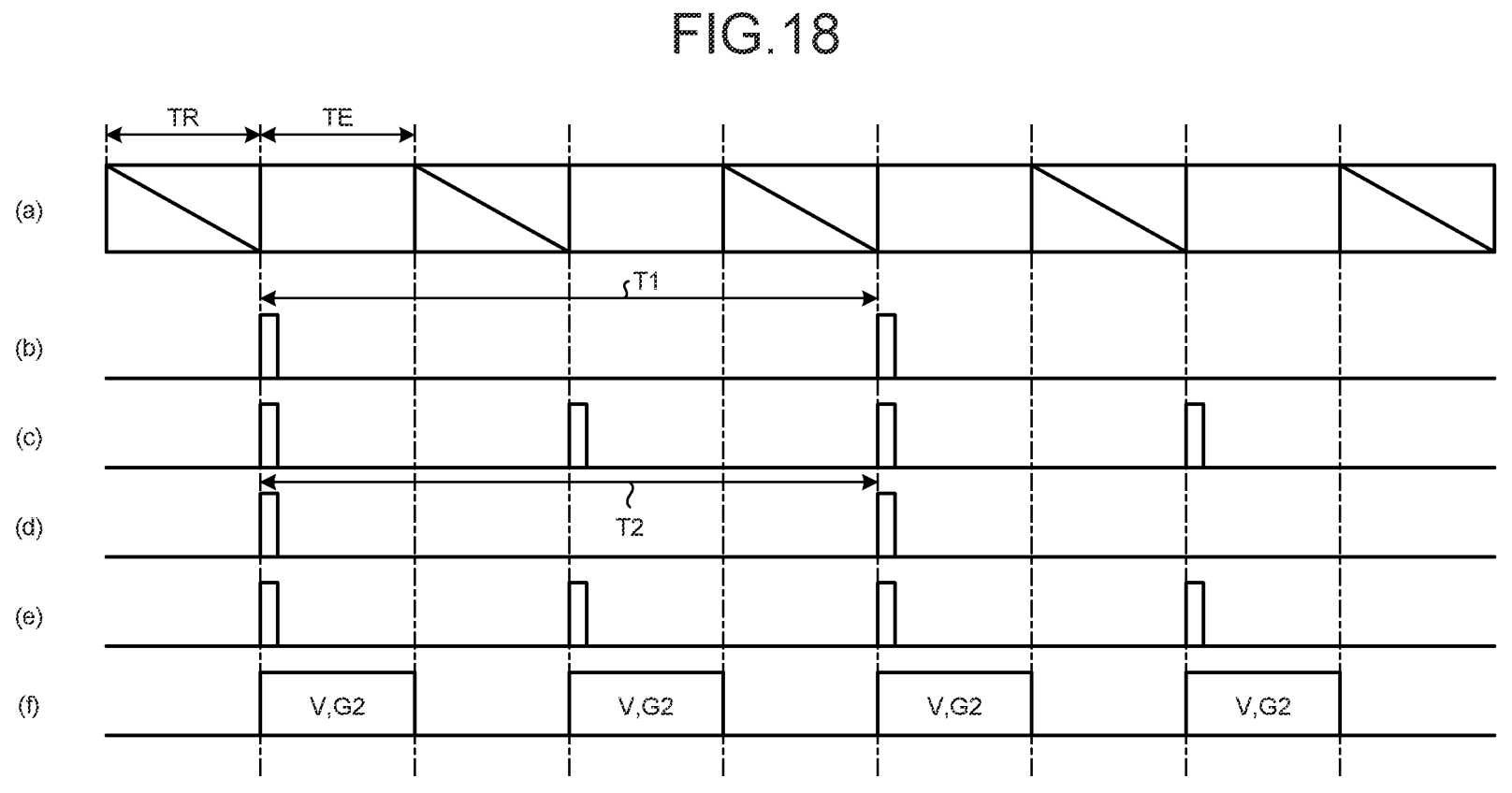

FIG. 17 is a diagram illustrating a state of the first and the second rotation units 7 and 8 in the second observation mode. Specifically, FIG. 17 is a diagram corresponding to FIG. 13. FIG. 18 is a time chart explaining the second observation mode. Specifically, (a) in FIG. 18 to (f) in FIG. 18 are diagrams corresponding to (a) in FIG. 8 to (f) in FIG. 8, respectively.

The control unit 61 positions the first area Ar1 at the irradiation position P by controlling the translation movement unit 56 as illustrated in FIG. 17.

Furthermore, the control unit 61 controls the imager 214 as illustrated in (a) in FIG. 18, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a two-frame period of the imager 214 based on the first-rotator position signal as illustrated in (b) in FIG. 18. Because the first area Ar1 is positioned at the irradiation position P, the first optical filter 74 is absent at the irradiation position P all the time when the first rotator 71 is rotating about the first center axis Ax1.

Furthermore, the control unit 61 operates the second rotator 81 by controlling the motor driving unit 53 as described below.

The control unit 61 sets such that the rotation period T2 of the second rotator 81 is the same as a two-frame period of the imager 214 based on the second-rotator position signal as illustrated in (d) in FIG. 18. Because the first area Ar1 is positioned at the irradiation position P, the second optical filter 84 is absent at the irradiation position P all the time when the second rotator 81 is rotating about the second center axis Ax1.

The control unit 61 lights the first and the third light sources 5111 and 5113 by controlling the light-source driving unit 52 as described below.

The control unit 61 lights the first and the third light sources 5111 and 5113 in the all-line exposure period TE as illustrated in (f) in FIG. 18. Thus, the light source device 5 for an endoscope emits light in which the violet light V and the second greenlight G2 are combined to the other end of the light guide 211 in the all-line exposure period TE. The light is irradiated to the inside of a living body, and the imager 214 captures the light (subject image) reflected from the inside of the living body. Moreover, the control unit 61 performs predetermined image processing with respect to an image signal (NBI image) output from the imager 214, and causes the display device 3 to display an NBI image subjected to the image processing.

Third to Fifth Observation Modes

Next, processing of the control unit 61 in the third to the fifth observation modes will be explained.

Figure 19:
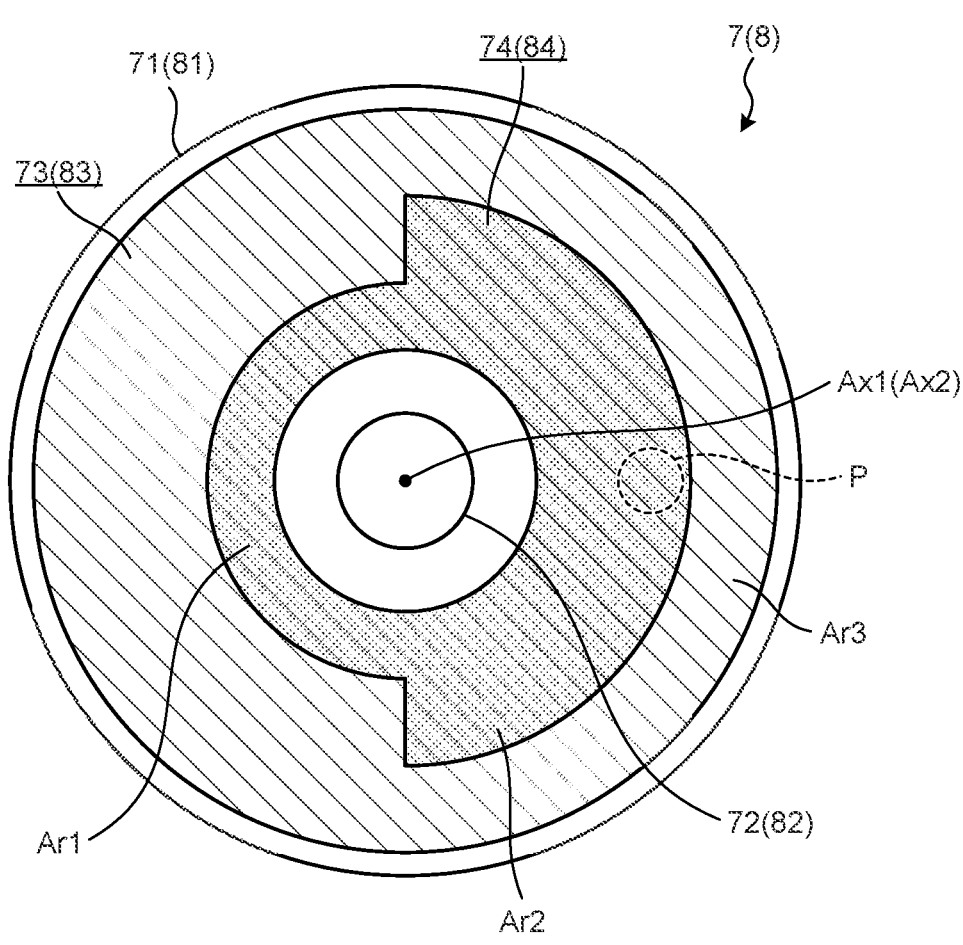
FIG. 19 is a diagram illustrating a state of the first and the second rotation units in the third to the fifth observation modes.

FIG. 19 is a diagram illustrating a state of the first and the second rotation units 7 and 8 in the third to the fifth observation modes.

The control unit 61 positions the second area Art at the irradiation position P by controlling the translation movement unit 56.

Because other processing of the control unit 61 is similar to the processing in the third to the fifth observation modes explained in the first embodiment described above, explanation thereof is omitted.

According to the second embodiment explained above, a following effect is produced in addition to effects similar to those of the first embodiment described above.

In the second embodiment explained above, the first and the second rotation units 7 and 8 are configured to be able to position the first to the third areas Ar1 to Ar3 at the irradiation position P.

Therefore, it is not necessary to change the respective rotation periods T1 and T2 of the first and the second rotators 71 and 81 in the first to the fifth observation modes.

Third Embodiment

Next, a third embodiment will be explained.

In the following explanation, same reference signs are assigned to components similar to those of the first embodiment described above, and detailed explanation thereof is omitted or simplified.

Figure 20:
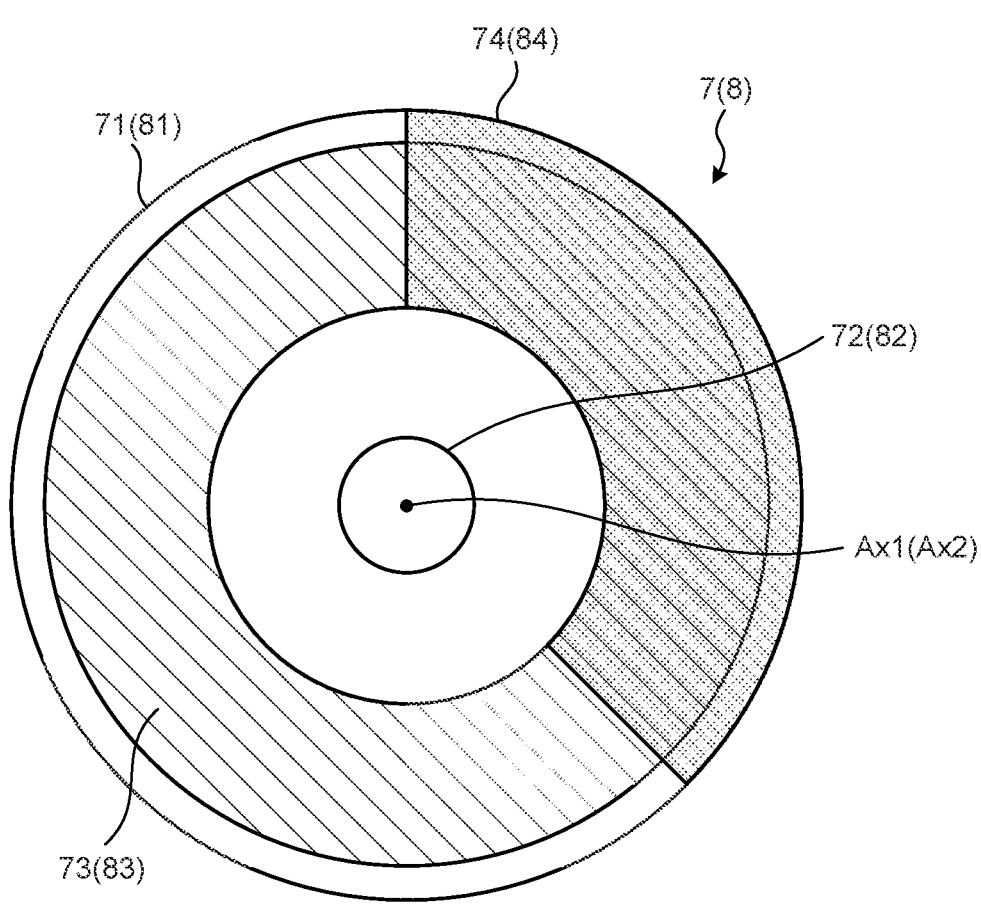
FIG. 20 is a diagram illustrating a first and a second rotation units according to a third embodiment.

FIG. 20 is a diagram illustrating the first and the second rotation units 7 and 8 according to the third embodiment. Specifically, FIG. 20 is a diagram corresponding to FIG. 2.

The first and the second rotation units 7 and 8 according to the third embodiment differ from the first and the second rotation units 7 and 8 explained in the first embodiment described above as illustrated in FIG. 20. Moreover, along with changes in the first and the second rotation units 7 and 8, processing performed by the control unit 61 is also different from the first embodiment described above.

The first and the second rotation units 7 and 8 according to the third embodiment have substantially the same configurations. Therefore, in the following, the first rotation unit 7 will be explained mainly. In FIG. 20, after reference signs indicating components of the first rotation unit 7, reference signs indicating components of the second rotation unit 8 substantially the same as the components of the first rotation unit 7 are given in brackets.

The first rotation unit 7 according to the third embodiment differs from the first rotation unit 7 explained in the first embodiment described above in a shape of the first optical filter 74.

Specifically, the first optical filter 74 has a shape extending by 120° of rotation angle along the direction of rotation about the first center axis Ax1 as illustrated in FIG. 20. The first optical filter 74 covers the first fluorescent material 73 in an intimate state attached to the first fluorescent material 73 in the direction along the first center axis Ax1.

A first-optical-filter position signal according to the third embodiment is output from the rotation detecting unit 54 when rotational symmetric positions of 120° (three positions) about the first center axis Ax1 including both end portions in the rotation direction of the first optical filter 74 are positioned at the irradiation position of blue light (excitation light) that is emitted from the third light source 5113 to the first rotation unit 7 when the first rotator 71 is rotating about the first center axis Ax1. As for a second-optical-filter position signal according to the third embodiment also, it is similar to the first-optical-filter position signal described above.

Next, a control method performed by the control unit 61 according to the third embodiment will be explained.

Hereinafter, processing of the control unit 61 in the first to a sixth observation modes will be sequentially explained.

The sixth observation mode is an observation mode in which the normal observation, the NBI observation, and the RDI observation are performed at the same time.

The control unit 61 switches to either one of the first to the sixth observation modes, for example, according to a user operation made with respect to the input unit 63.

First Observation Mode

First, the processing of the control unit 61 in the first observation mode will be explained.

Figure 21:
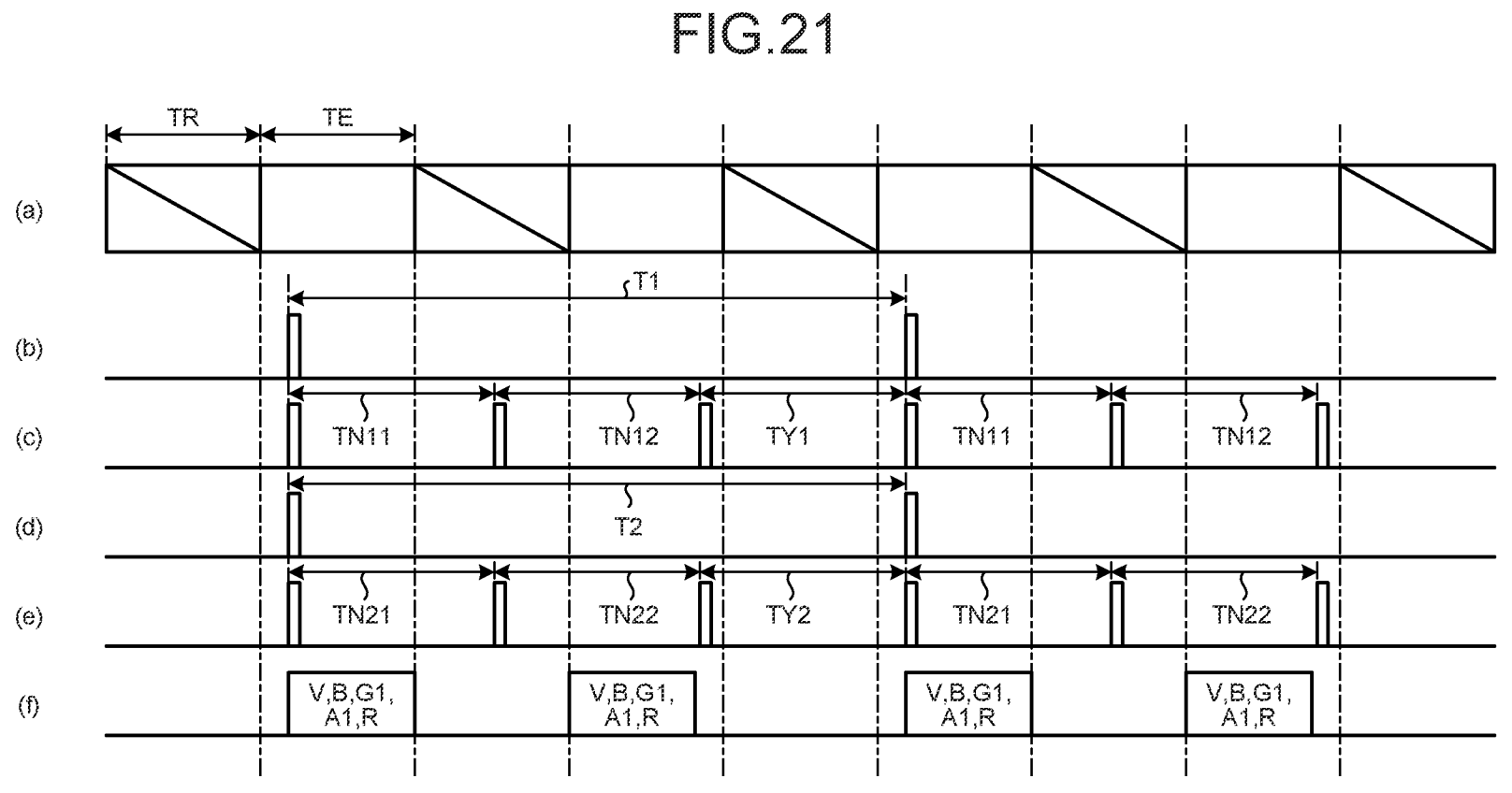

FIG. 21 is a time chart explaining the first observation mode. Specifically, (a) in FIG. 21 to (f) in FIG. 21 are diagrams corresponding to (a) in FIG. 8 to (f) in FIG. 8.

The control unit 61 controls the imager 214 as illustrated in (a) in FIG. 21, similarly to the first observation mode illustrated in (a) in FIG. 8.

Furthermore, the control unit 61 operates the first rotator 71 by controlling the motor driving unit 53 as described below.

The control unit 61 sets such that the rotation period T1 of the first rotator 71 is the same period as two-frame period of the imager 214 as illustrated in (b) in FIG. 21 based on the first-rotator position signal. Furthermore, the control unit 61 sets such that first filter-absent periods TN11 and TN12 overlap with the all-line exposure period TE as illustrated in (c) in FIG. 21 based on the first-optical-filter position signal. Moreover, the control unit 61 sets such that a period in which the first filter-absent period TN11 and the all-line exposure period TE overlap and a period in which the first filter-absent period TN12 and the all-line exposure period TE overlap are the same period.

The first filter-absent period TN11 is a period in which a half of an area in which the first optical filter 74 is not present (area extending by 240° of rotation angle along the rotation direction about the first center axis Ax1) is positioned at the irradiation position of blue light (excitation light) that is emitted from the third light source 5113 to the first rotation unit 7 while the first rotator 71 is rotating about the center axis Ax1. Moreover, the first filter-absent period TN12 is a period in which a remaining half of the area in which the first optical filter 74 is not present is positioned at the irradiation position while the first rotator 71 is rotating about the first center axis Ax1. Furthermore, the first filter-present period TY1 is a period in which the first optical filter 74 is present is positioned at the irradiation position while the first rotator 71 is rotating about the first center axis Ax1.

Moreover, the control unit 61 operates the second rotator 81 by controlling the motor driving unit 53 as described below.

The control unit 61 sets such that the rotation period T2 of the second rotator 81 is the same period as a two-frame period of the imager 214 as illustrated in (d) in FIG. 21. Furthermore, the control unit 61 sets such that the second filter-absent period TN21 coincides with the first filter-absent period TN11, the second filter-absent period TN22 coincides with the first filter-absent period TN12, and the second filter-present period TY2 coincides with the first filter-present period TY1 as illustrated in (e) in FIG. 21. That is, the control unit 61 sets the phases in the rotation periods T1 and T2 of the first and the second rotators 71 and 81 to be the same.

The second filter-absent period TN21 is a period in which a half of an area in which the second optical filter 84 is not present (area extending by 240° of rotation angle along the rotation direction about the second center axis Ax2) is positioned at the irradiation position of blue light (excitation light) that is emitted from the fourth light source 5114 to the second rotation unit 8 while the second rotator 81 is rotating about the second center axis Ax2. Moreover, the second filter-absent period TN22 is a period in which a remaining half of the area in which the second optical filter 84 is not present is positioned at the irradiation position while the second rotator 81 is rotating about the center axis Ax2. Moreover, the second filter-present period TY2 is a period in which an area in which the second optical filter 84 is present is positioned at the irradiation position while the second rotator 81 is rotating about the center axis Ax1.

The control unit 61 lights the first to the fifth light sources 5111 to 5115 by controlling the light-source driving unit 52 as described below.

The control unit 61 lights the first to the fifth light sources 5111 to 5115 in the period in which the first filter-absent period TN11 (second filter-absent period TN21) and the all-line exposure period TE overlap, and the period in which the first filter-absent period TN12 (second filter-absent period TN22) and the all-line exposure period TE overlap as illustrated in (f) in FIG. 21. Thus, the light source device 5 for an endoscope emits white light in which the violet light V, the blue light B, the first green light G1, the first amber light A1, and the red light R are combined to the other end of the light guide 211 in the period in which the first filter-absent period TN11 (second filter-absent period TN21) and the all-line exposure period TE overlap, and the period in which the first filter-absent period TN12 (second filter-absent period TN22) and the all-line exposure period TE overlap. The white light is irradiated to the inside of a living body, and the imager 214 captures white light (subject image) reflected from the inside of the living body. Moreover, the control unit 61 performs predetermined image processing with respect to an image signal (white light image) output from the imager 214, and causes the display device 3 to display the white light image subjected to the image processing.

Second Observation Mode

Next, the processing of the control unit 61 in the second observation mode will be explained.

Figure 22:
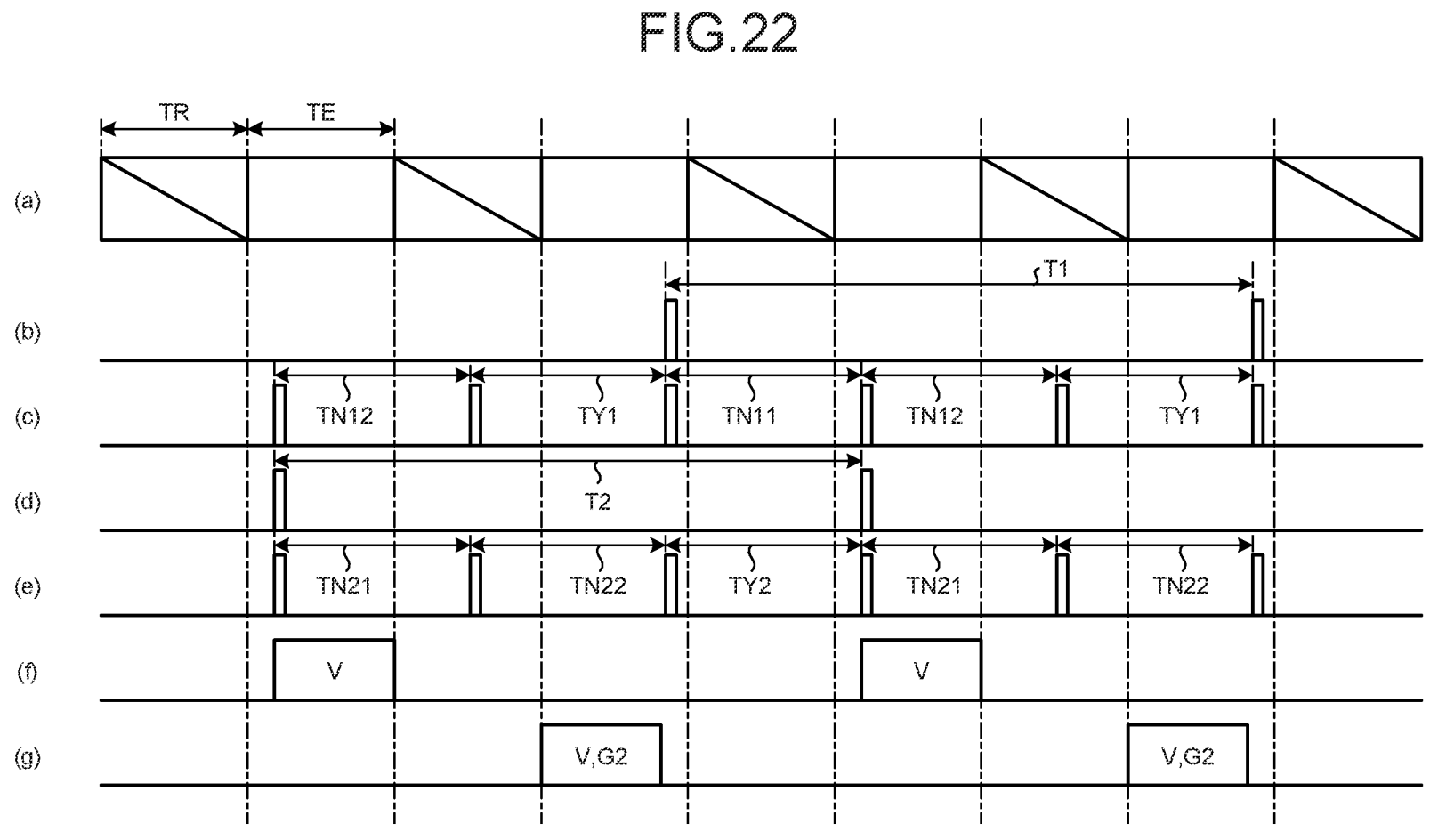

FIG. 22 is a time chart explaining the second observation mode. Specifically, (a) in FIG. 22 to (e) in FIG. 22 are diagrams corresponding to (a) in FIG. 8 to (e) in FIG. 8, respectively. (f) in FIG. 22 and (g) in FIG. 22 are diagrams corresponding to (f) in FIG. 8.

The control unit 61 controls the imager 214 as illustrated in (a) in FIG. 22, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a two-frame period of the imager 214 based on the first-rotator position signal as illustrated in (b) in FIG. 22. Moreover, the control unit 61 sets such that the first filter-absent period TN12 and the first filter-present period TY1 overlap with the all-line exposure period TE as illustrated in (c) in FIG. 22 based on the first-optical-filter position signal. Furthermore, the control unit 61 sets such that a period in which the first filter-absent period TN12 and the all-line exposure period TE overlap and a period in which the first filter-present period TY1 and the all-line exposure period TE overlap are the same period.

Moreover, the control unit 61 operates the second rotator 81 by controlling the motor driving unit 53 as described below.

The control unit 61 sets such that the rotation period T2 of the second rotator 81 is the same period as a two-frame period of the imager 214 as illustrated in (d) in FIG. 22 based on the second-rotator position signal. Furthermore, the control unit 61 sets such that the second filter-absent period TN21 coincides with the first filter-absent period TN12, the second filter-absent period TN22 coincides with the first filter-present period TY1, and the second filter-present period TY2 coincides with the first filter-absent period TN11 as illustrated in (e) in FIG. 22 based on the second-optical-filter position signal. That is, the control unit 61 shifts phases by 120° in the rotation periods T1 and T2 of the first and the second rotators 71 and 81.

The control unit 61 lights the first and the third light sources 5111 and 5113 by controlling the light-source driving unit 52 as described below.

The control unit 61 lights the first light source 5111 in a period in which the first filter-absent period TN12 (second filter-absent period TN21) and the all-line exposure period TE overlap as illustrated in (f) in FIG. 22. Thus, the light source device 5 for an endoscope emits the violet light V to the other end of the light guide 211 in the period in which the first filter-absent period TN12 (second filter-absent period TN21) and the all-line exposure period TE overlap. The violet light V is emitted to the inside of a living body, and the imager 214 captures the violet light V (subject image) reflected from the inside of the living body. Moreover, the control unit 61 performs predetermined image processing with respect to an image signal (image based on the violet light) output from the imager 214.

Furthermore, the control unit 61 lights the first and the third light sources 5111 and 5113 in the period in which the first filter-present period TY1 (second filter-absent period TN22) and the all-line exposure period TE overlap as illustrated in (g) in FIG. 22. Thus, the light source device 5 for an endoscope emits light in which the violet light V and the second green light G2 are combined to the other end of the light guide 211 in the period in which the first filter-present period TY1 (second filter-absent period TN22) and the all-line exposure period TE overlap. The light is emitted to the inside of a living body, and the imager 214 captures the light (subject image) reflected from the inside of the living body. Moreover, the control unit 61 performs predetermined image processing with respect to an image signal (image based on the violet light V and the second green light G2) output from the imager 214.

The control unit 61 then generates an NBI image from the image based on the violet light V subjected to the image processing and the image based on the violet light V and the second green light G2 subjected to the image processing, and causes the display device 3 to display the NBI image.

Third Observation Mode

Next, the processing of the control unit 61 in the third observation mode will be explained.

Figure 23:
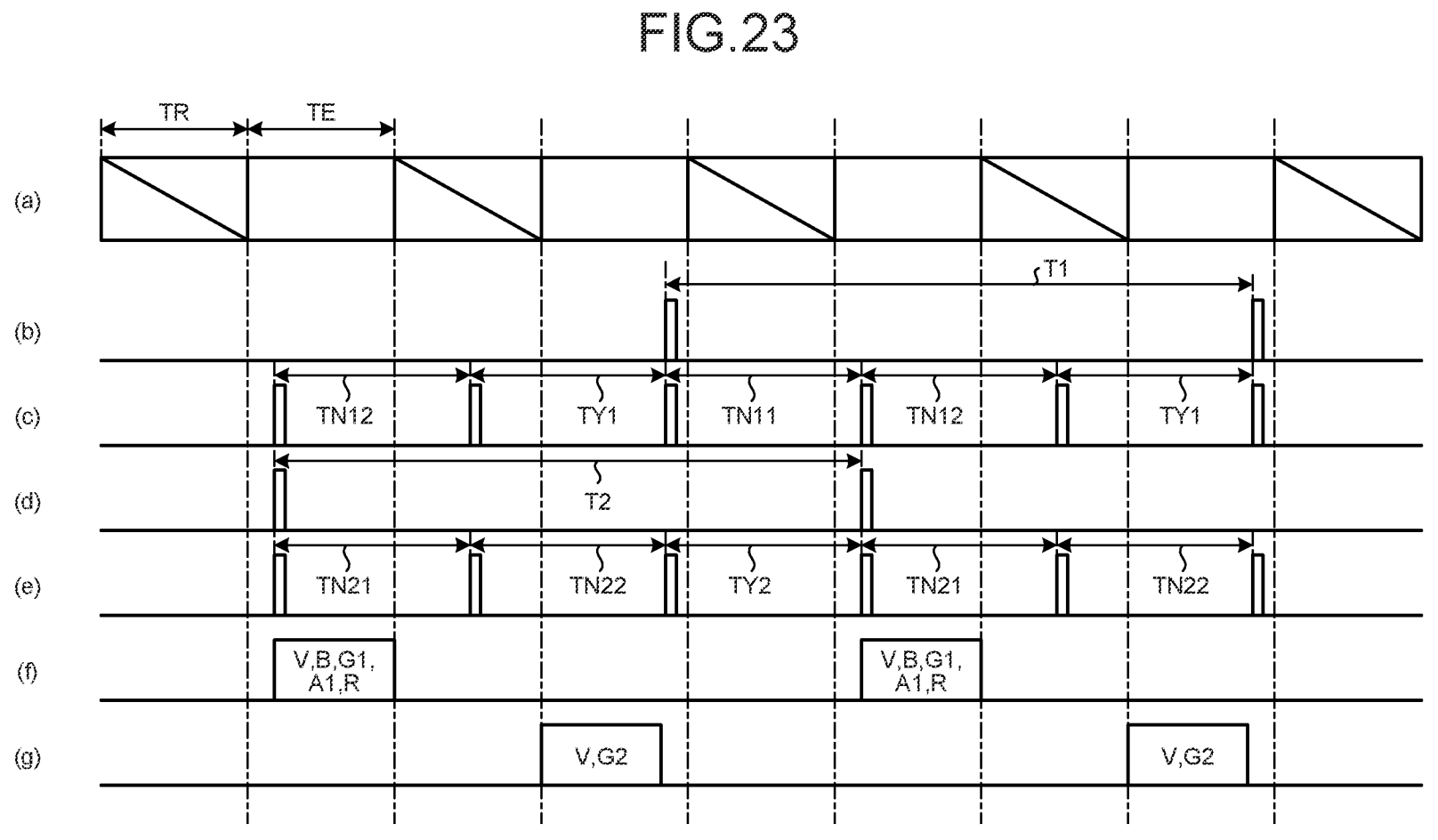

FIG. 23 is a time chart explaining the third observation mode. Specifically, (a) in FIG. 23 to (e) in FIG. 23 are diagrams corresponding to (a) in FIG. 8 to (e) in FIG. 8, respectively. (f) in FIG. 23 and (g) in FIG. 23 are diagrams corresponding to (f) in FIG. 8.

The control unit 61 controls the imager 214 as illustrated in (a) in FIG. 23, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a two-frame period of the imager 214 as illustrated in (b) in FIG. 23 based on the first-rotator position signal. Furthermore, the control unit 61 sets such that the first filter-absent period TN12 and the first filter-present period TY1 respectively overlap with all-line exposure period TE as illustrated in (c) in FIG. 23 based on the first-optical-filter position signal. Moreover, the control unit 61 sets such that a period in which the first filter-absent period TN12 and the all-line exposure period TE overlap and a period in which the first filter-present period TY1 and the all-line exposure period TE overlap are the same period.

Furthermore, the control unit 61 operates the second rotator 81 by controlling the motor driving unit 53 as described below.

The control unit 61 sets such that the rotation period T2 of the second rotator 81 is the same period as a two-frame period of the imager 214 as illustrated in (d) in FIG. 23 based on the second-rotator position signal. Moreover, the control unit 61 sets such that the second filter-absent period TN21 coincides with the first filter-absent period TN12, the second filter-absent period TN22 coincides with the first filter-present period TY1, and the second filter-present period TY2 coincides with the first filter-absent period TN11 as illustrated in (e) in FIG. 23 based on the second-optical-filter position signal. That is, the control unit 61 shifts phases by 120° in the rotation periods T1 and T2 of the first and the second rotators 71 and 81.

The control unit 61 lights the first to the fifth light sources 5111 to 5115 by controlling the light-source driving unit 52 as described below.

The control unit 61 lights the first to the fifth light sources 5111 to 5115 in the period in which the first filter-absent period TN12 (second filter-absent period TN21) and the all-line exposure period TE overlap as illustrated in (f) in FIG. 23. Thus, the light source device 5 for an endoscope emits white light in which the violet light V, the blue light B, the first green light G1, the first amber light A1, and the red light R are combined to the other end of the light guide 211 in the period in which the first filter-absent period TN12 (second filter-absent period TN21) and the all-line exposure period TE overlap. The white light is emitted to the inside of a living body, and the imager 214 captures white light (subject image) reflected from the inside of the living body. Moreover, the control unit 61 performs predetermined image processing with respect to an image signal (white light image) output from the imager 214.

Moreover, the control unit 61 lights the first and the third light sources 5111 and 5113 in a period in which the first filter-present period TY1 (second filter-absent period TN22) and the all-line exposure period TE overlap as illustrated in (g) in FIG. 23. Thus, the light source device 5 for an endoscope emits light in which the violet light V and the second green light G2 are combined to the other end of the light guide 211 in the period in which the first filter-present period TY1 (second filter-absent period TN22) and the all-line exposure period TE overlap. The light is emitted to the inside of a living body, and the imager 214 captures the light (subject image) reflected from the inside of the living body. Moreover, the control unit 61 performs predetermined image processing with respect to an image signal (NBI image) output from the imager 214.

The control unit 61 then displays the white light image subjected to the image processing and the NBI image subjected to the image processing in an aligned manner, or in a superimposed manner on the display device 3.

Fourth Observation Mode

Next, the processing of the control unit 61 in the fourth observation mode will be explained.

Figure 24:
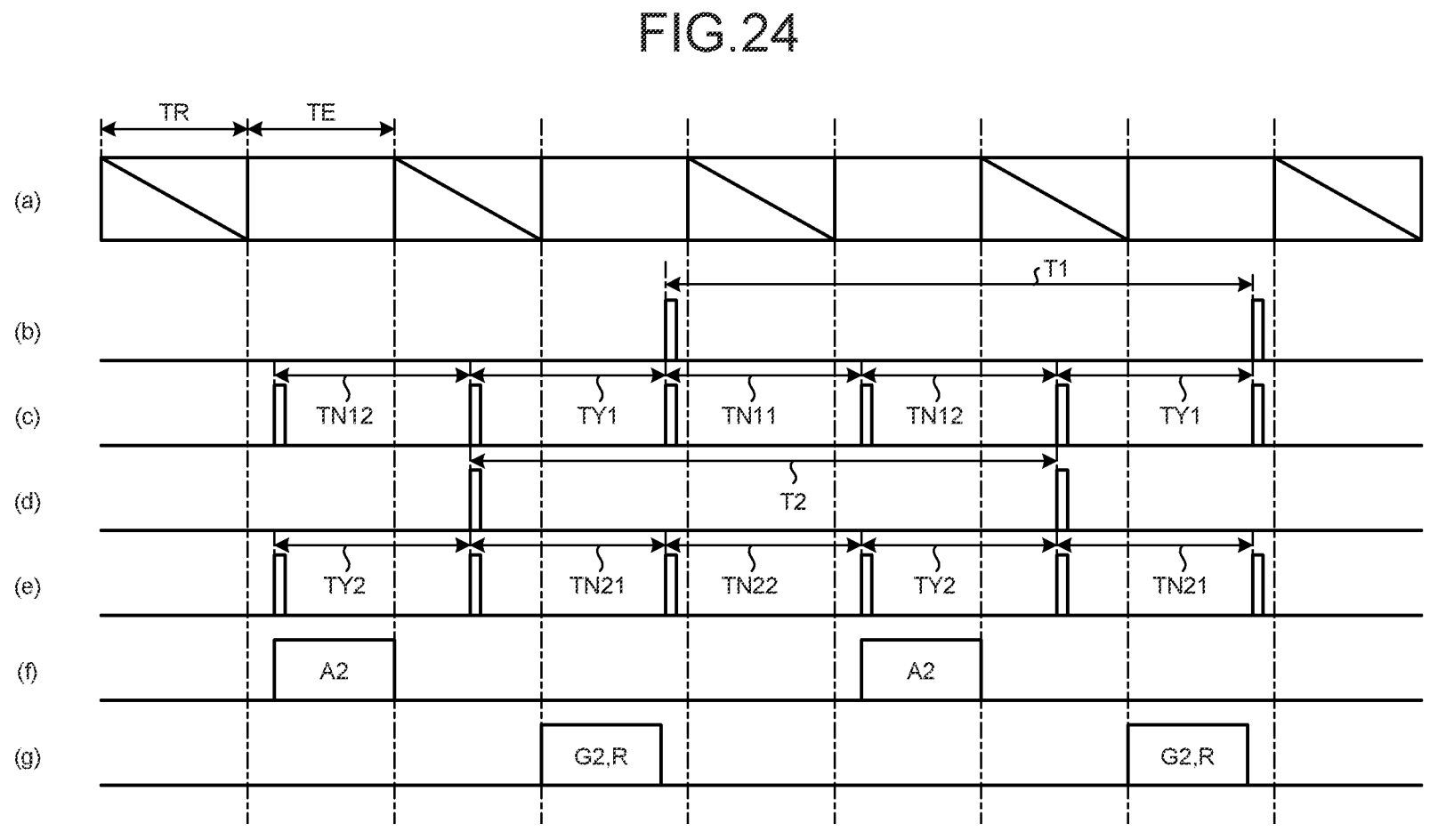

FIG. 24 is a time chart explaining the fourth observation mode. Specifically, (a) in FIG. 24 to (e) in FIG. 24 are diagrams corresponding to (a) in FIG. 8 to (e) in FIG. 8, respectively. (f) in FIG. 24 and (g) in FIG. 24 are diagrams corresponding to (f) in FIG. 8.

The control unit 61 controls the imager 214 as illustrated in (a) in FIG. 24, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a two-frame period of the imager 214 as illustrated in (b) in FIG. 24 based on the first-rotator position signal. Furthermore, the control unit 61 sets such that the first filter-absent period TN12 and the first filter-present period TY1 respectively overlap with the all-line exposure period TE as illustrated in (c) in FIG. 24 based on the first-optical-filter position signal. Furthermore, the control unit 61 sets such that a period in which the first-filter-absent period TN12 and the all-line exposure period TE overlap and a period in which the first filter-present period TY1 and the all-line exposure period TE overlap are the same period.

Moreover, the control unit 61 operates the second rotator 81 by controlling the motor driving unit 53 as described below.

The control unit 61 sets such that the rotation period T2 of the second rotator 81 is the same period as a two-frame period of the imager 214 as illustrated in (d) in FIG. 24 based on the second-rotator position signal. Furthermore, the control unit 61 sets such that the second filter-present period TY2 coincides with the first filter-absent period TN12, the second filter-absent period TN21 coincides with the first filter-present period TY1, and the second filter-absent period TN22 coincides with the first filter-absent period TN11 as illustrated in (e) in FIG. 24. That is, the control unit 61 shifts phases by 120° in the rotation periods T1 and T2 of the first and the second rotators 71 and 81.

The control unit 61 lights the third to the fifth light sources 5113 to 5115 by controlling the light-source driving unit 52 as described below.

The control unit 61 lights the fourth light source 5114 in the period in which the first filter-absent period TN12 (second filter-present period TY2) and the all-line exposure period TE overlap as illustrated in (f) in FIG. 24. Thus, the light source device 5 for an endoscope emits the second amber light A2 to the other end of the light guide 211 in the period in which the first filter-absent period TN12 (second filter-present period TY2) and the all-line exposure period TE overlap. The second amber light A2 is irradiated to the inside of a living body, and the imager 214 captures the second amber light A2 (subject image) reflected from the inside of the living body. Moreover, the control unit 61 performs predetermined image processing with respect to an image signal (image based on the second amber light A2) output from the imager 214.

Furthermore, the control unit 61 lights the third and the fifth light sources 5113 and 5115 in the period in which the first filter-present period TY1 (second filter-absent period TN12) and the all-line exposure period TE overlap as illustrated in (g) in FIG. 24. Thus, the light source device 5 for an endoscope emits light in which the second green light G2 and the red light R are combined to the other end of the light guide 211 in the period in which the first filter-present period TY1 (second filter-absent period TN12) and the all-line exposure period TE overlap. The light is irradiated to the inside of a living body, and the imager 214 captures the light (subject image) reflected from the inside of the living body. Moreover, the control unit 61 performs predetermined image processing with respect to an image signal (image based on the second green light G2 and the red light R) output from the imager 214.

The control unit 1 then generates an RDI image from the image based on the second amber light A2 subjected to the image processing and the image based on the second green light G2 and the red light R subjected to the image processing, and causes the display device 3 to display the RDI image.

Fifth Observation Mode

Next, the processing of the control unit 61 in the fifth observation mode will be explained.

Figure 25:
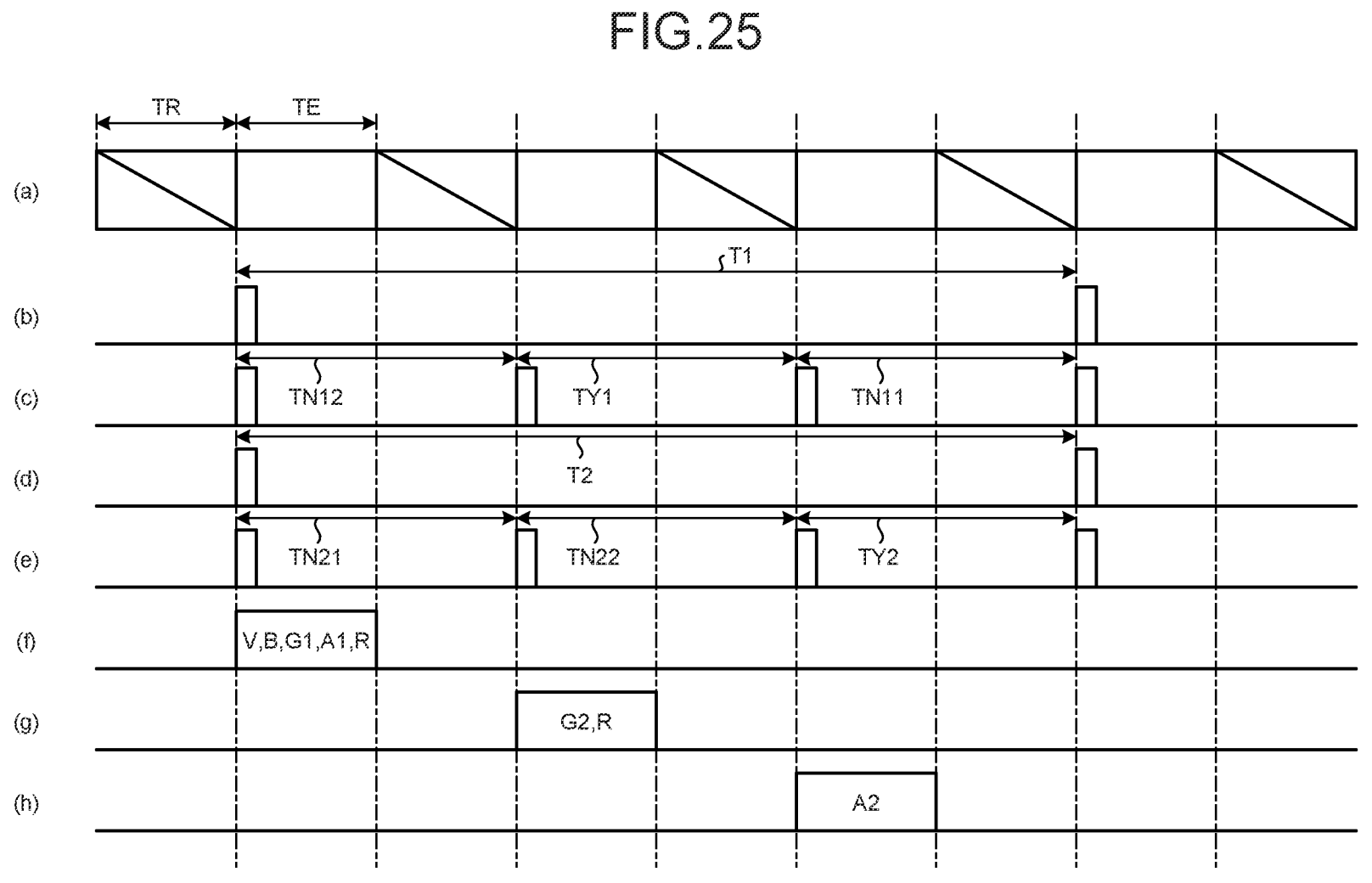

FIG. 25 is a time chart explaining the fifth observation mode. Specifically, (a) in FIG. 25 to (e) in FIG. 25 are diagrams corresponding to (a) in FIG. 8 to (e) in FIG. 8, respectively. (f) in FIG. 25 to (h) in FIG. 25 are diagrams corresponding to (f) in FIG. 8.

The control unit 61 controls the imager 214 as illustrated in (a) in FIG. 25, similarly to the first observation mode illustrated in (a) in FIG. 8.

Moreover, the control unit 61 operates the first rotator 71 by controlling the motor driving unit 53 as described below.

The control unit 61 sets such that the rotation period T1 of the first rotator 71 is the same period as a three-frame period of the imager 214 as illustrated in (b) in FIG. 25 based on the first-rotator position signal. Furthermore, the control unit 61 sets such that the first filter-absent period TN12 coincides with two periods TE and TR that are continuous in the order of the all-line exposure period TE and the readout period TR as illustrated in (c) in FIG. 25 based on the first-optical-filter position signal. In other words, the control unit 61 sets the first filter-present period TY1 coincides with the two periods TE and TR that are continuous in the order of the all-line exposure period TE and the readout period TR based on the first-optical-filter position signal. Moreover, the control unit 61 sets such that the first filter-absent period TN11 coincides with two periods TE and TR that are continuous in the order of the all-line exposure period TE and the readout period TR based on the first-optical-filter position signal.

Moreover, the control unit 61 operates the second rotator 81 by controlling the motor driving unit 53 as described below.

The control unit 61 sets such that the rotation period T2 of the second rotator 81 is the same period as a three-frame period of the imager 214 as illustrated in (d) in FIG. 25 based on the second-rotator position signal. Furthermore, the control unit 61 sets such that the second filter-absent period TN21 coincides with the first filter-absent period TN12, the second filter-absent period TN22 coincides with the first filter-present period TY1, and the second filter-present period TY2 coincides with the first filter-absent period TN11 as illustrated in (e) in FIG. 25 based on the second-optical-filter position signal. That is, the control unit 61 shifts phases by 120° in the rotation periods T1 and T2 of the first and the second rotators 71 and 81.

The control unit 61 lights the first to the fifth light sources 5111 to 5115 by controlling the light-source driving unit 52 as described below.

The control unit 61 lights the first to the fifth light sources 5111 to 5115 in the all-line exposure period TE of the period in which the first filter-absent period TN12 (second filter-absent period TN21) as illustrated in (f) in FIG. 25. Thus, the light source device 5 for an endoscope emits the white light in which the violet light V, the blue light B, the first green light G1, the first amber light A1, and the red light R are combined to the other end of the light guide 211 in the all-line exposure period TE of the first filter-absent periods TN12 (second filter-absent period TN21). The white light is irradiated to the inside of a living body, and the imager 214 captures white light (subject image) reflected from the inside of the living body. Moreover, the control unit 61 performs predetermined image processing with respect to an image signal (white light image) output from the imager 214.

Furthermore, the control unit 61 lights the third and the fifth light sources 5113 and 5115 in the all-line exposure period TE of the first filter-present period TY1 (second filter-absent period TN22) as illustrated in (g) in FIG. 25. Thus, the light source device 5 for an endoscope emits light in which the second green light G2 and the red light R are combined to the other end of the light guide 211 in the all-line exposure period TE of the first filter-present period TY1 (second filter-absent period TN22). The light is irradiated to the inside of a living body, and the imager 214 captures the light (subject image) reflected from the inside of the living body. Moreover, the control unit 61 performs predetermined image processing with respect to an image signal (image based on the second green light G2 and the red light R) output from the imager 214.

Moreover, the control unit 61 lights the fourth light source 5114 in the all-line exposure period TE of the first filter-absent period TN11 (second filter-present period TY2) as illustrated in (h) in FIG. 25. Thus, the light source device 5 for an endoscope emits the second amber light A2 to the other end of the light guide 211 in the all-line exposure period TE of the first filter-absent period TN11 (second filter-present period TY2). The second amber light A2 is irradiated to the inside of a living body, and the imager 214 captures the second amber light A2 (subject image) reflected from the inside of the living body. Moreover, the control unit 61 performs predetermined image processing with respect to an image signal (image based on the second amber light A2) output from the imager 214.

The control unit 1 then generates an RDI image from the image based on the second amber light A2 subjected to the image processing and the image based on the second green light G2 and the red light R subjected to the image processing. Furthermore, the control unit 61 displays the white light image and the RDI image subjected to the image processing in an aligned manner or in a superimposed manner on the display device 3.

Sixth Observation Mode

Next, the processing of the control unit 61 in the sixth observation mode will be explained.

Figure 26:
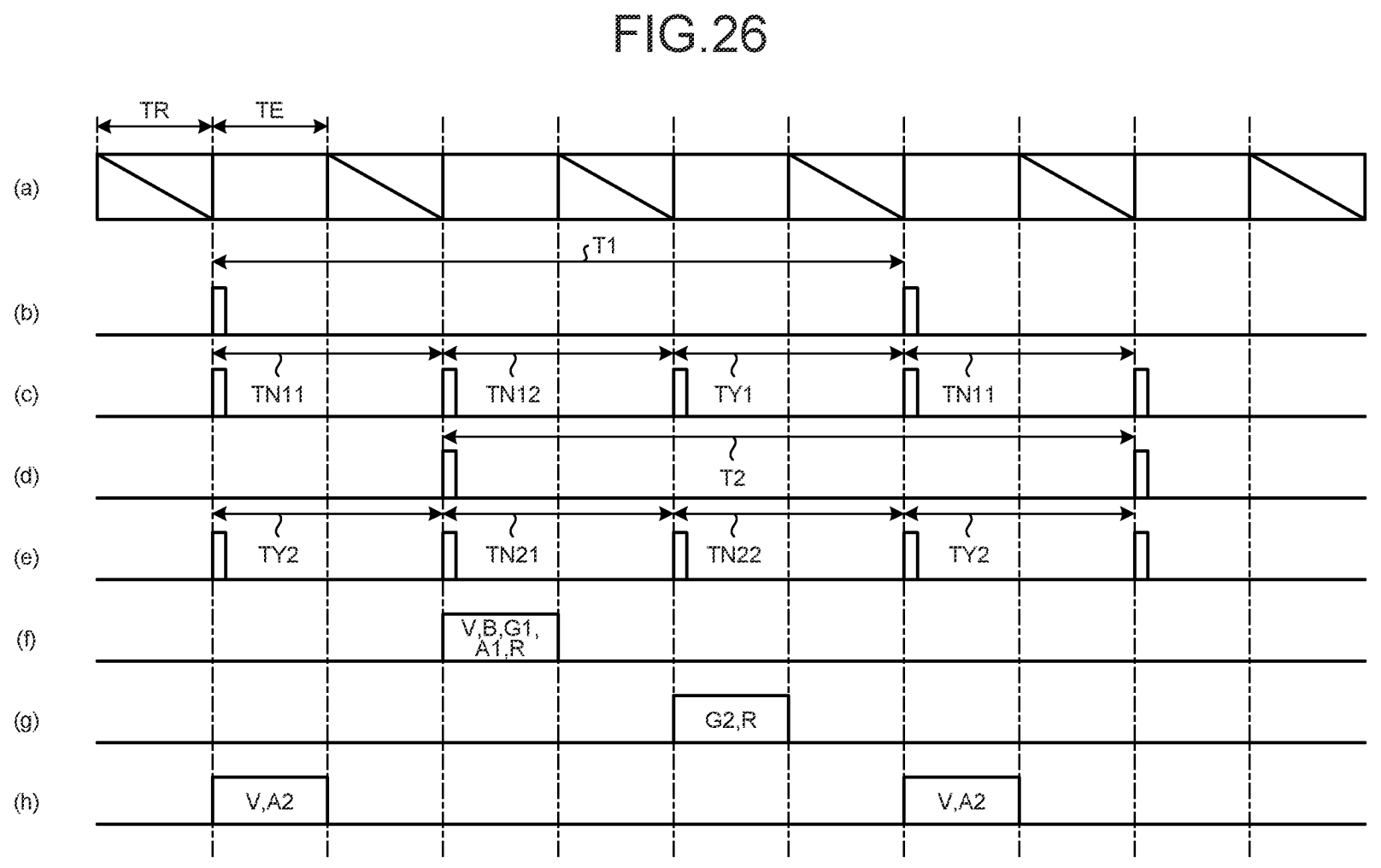

FIG. 26 is a time chart explaining the sixth observation mode. Specifically, (a) in FIG. 26 to (e) in FIG. 26 are diagrams corresponding to (a) in FIG. 8 to (e) in FIG. 8, respectively. (f) in FIG. 26 to (h) in FIG. 26 are diagrams corresponding to (f) in FIG. 8.

The control unit 61 controls the imager 214 as illustrated in (a) in FIG. 26, similarly to the first observation mode illustrated in (a) in FIG. 8.

Furthermore, the control unit 61 operates the first rotator 71 by controlling the motor driving unit 53 as described below.

The control unit 61 sets such that the rotation period T1 of the first rotator 71 is the same period as a three-frame period of the imager 214 as illustrated in (b) in FIG. 26 based on the first-rotator position signal. Moreover, the control unit 61 sets such that the first filter-absent period TN12 coincides with the two periods TE and TR that are continuous in the order of the all-line exposure period TE and the readout period TR based on the first-optical-filter position signal as illustrated in (c) in FIG. 26. In other words, the control unit 61 sets such that the first filter-present period TY1 coincides with the two periods TE and TR that are continuous in the order of the all-line exposure period TE and the readout period TR based on the first-optical-filter position signal. Moreover, the control unit 61 sets such that the first filter-absent period TN11 coincides with two periods TE and TR that are continuous in the order of the all-line exposure period TE and the readout period TR based on the first-optical-filter position signal.

Furthermore, the control unit 61 operates the second rotator 81 by controlling the motor driving unit 53 as described below.

The control unit 61 sets such that the rotation period T2 of the second rotator 81 is the same period as a three-frame period of the imager 214 as illustrated in (d) in FIG. 26 based on the second-rotator position signal. Moreover, the control unit 61 sets such that the second filter-absent period TN21 coincides with the first filter-absent period TN12, the second filter-absent period TN22 coincides with the first filter-present period TY1, and the second filter-present period TY2 coincides with the first filter-absent period TN11 as illustrated in (e) in FIG. 26 based on the second-optical-filter position signal. That is, the control unit 61 shifts phases by 120° in the rotation periods T1 and T2 of the first and the second rotators 71 and 81.

The control unit 61 lights the first to the fifth light sources 5111 to 5115 by controlling the light-source driving unit 52 as described below.

The control unit 61 lights the first to the fifth light sources 5111 to 5115 in the all-line exposure period TE in the first filter-absent period TN12 (second filter-absent period TN21) as illustrated in (f) in FIG. 26. Thus, the light source device 5 for an endoscope emits white light in which the violet light V, the blue light B, the first green light G1, the first amber light A1, and the red light R are combined to the other end of the light guide 211 in the all-line exposure period TE in the first filter-absent period TN12 (second filter-absent period TN21). The white light is emitted to the inside of a living body, and the imager 214 captures white light (subject image) reflected from the inside of the living body. Moreover, the control unit 61 performs predetermined image processing with respect to an image signal (white light image) output from the imager 214.

Furthermore, the control unit 61 lights the third and the fifth light sources 5113 and 5115 in the all-line exposure period TE in the first filter-present period TY1 (second filter-absent period TN22) as illustrated in (g) in FIG. 26. Thus, the light source device 5 for an endoscope emits light in which the second green light G2 and the red light R are combined to the other end of the light guide 211 in the all-line exposure period TE in the first filter-present period TY1 (second filter-absent period TN22). The light is emitted to the inside of a living body, and the imager 214 captures the light (subject image) reflected from the inside of the living body. Moreover, the control unit 61 performs predetermined image processing with respect to an image signal (image based on the second green light G2 and the red light R) output from the imager 214.

Furthermore, the control unit 61 lights the first and the fourth light sources 5111 and 5114 in the all-line exposure period TE in the first filter-absent period TN11 (second filter-present period TY2) as illustrated in (h) in FIG. 26. Thus, the light source device 5 for an endoscope emits light in which the violet light V and the second amber light A2 are combined to the other end of the light guide 211 in the all-line exposure period TE in the first filter-absent period TN11 (second filter-present period TY2). The light is emitted to the inside of a living body, and the imager 214 captures the light (subject image) reflected from the inside of the living body. Moreover, the control unit 61 performs predetermined image processing with respect to an image signal (image based on the violet light V and the second amber light A2) output from the imager 214.

The control unit 61 then generates an NBI image from a component of the second green light G2 in the image based on the second green light G2 and the red light R subjected to the image processing and a component of the violet light in the image based on the violet light V and the second amber light A2 subjected to the image processing. Furthermore, the control unit 61 generates an RDI image from the image based on the second green light G2 and the red light R subjected to the image processing and a component of the second amber light A2 in the image based on the violet light V and the second amber light A2 subjected to the image processing. The control unit 61 displays the white light image subjected to the image processing, the NBI image and the RDI image in an aligned manner or in a superimposed manner on the display device 3.

As in the third embodiment explained above, by changing the shapes of the first and the second optical filters 74 and 84, effects similar to those of the first embodiment described above are produced, and in addition to the first to the fifth observation modes, the sixth observation mode can also be performed.

Fourth Embodiment

Next, a fourth embodiment will be explained.

In the following explanation, same reference signs are assigned to components similar to those of the first embodiment described above, and detailed explanation thereof is omitted or simplified.

The imager 214 according to the fifth embodiment is composed of a CCD, which is a global shutter imager, not a CMOS, which as a rolling shutter imager explained in the first embodiment described above. Moreover, along with a change in the imager 214, processing performed by the control unit 61 also differs from the first embodiment described above.

Hereinafter, processing of the control unit 61 in the first to the fifth observation modes will be sequentially explained.

First Observation Mode

First, the processing of the control unit 61 in the first observation mode will be explained.

Figure 27:
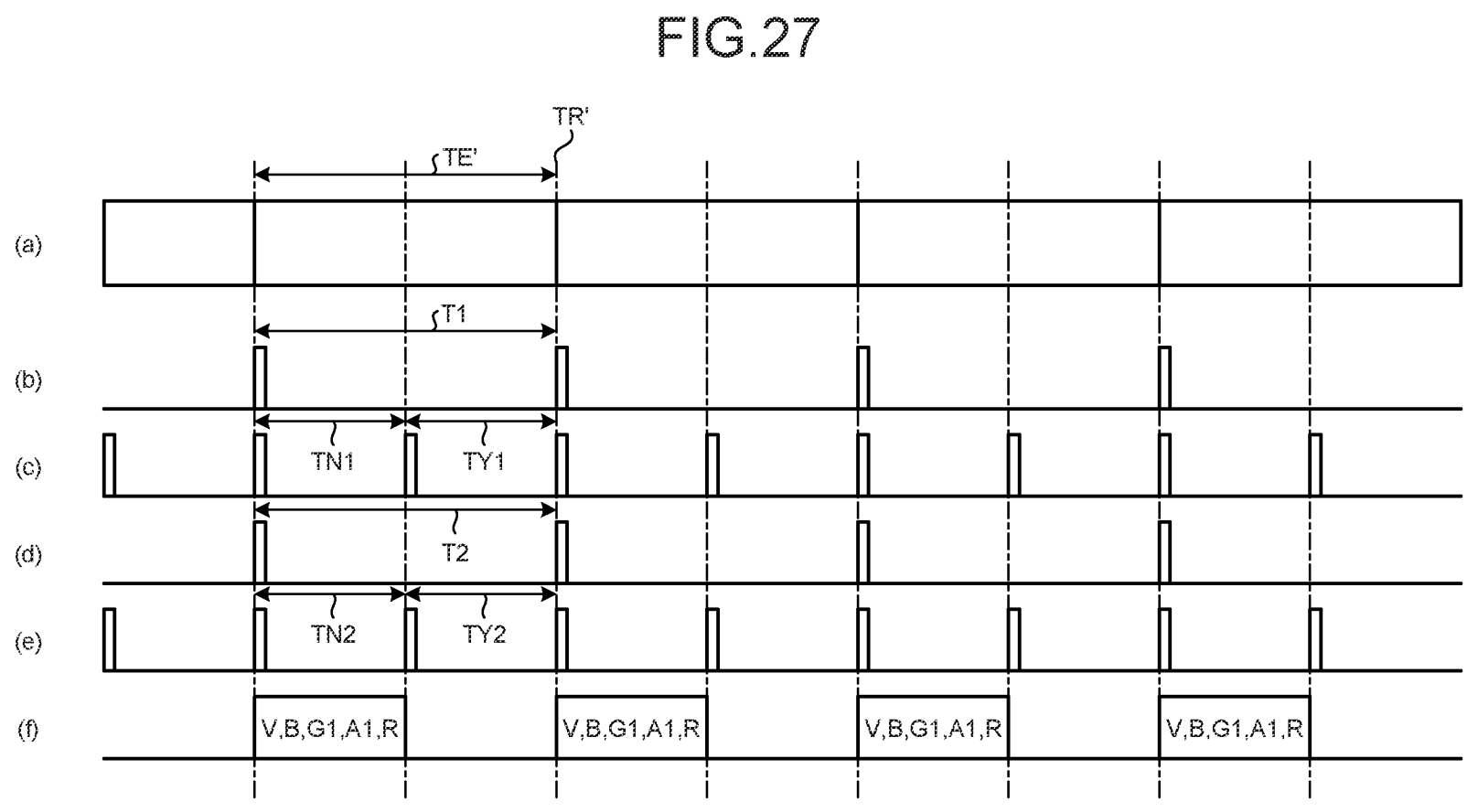

FIG. 27 is a time chart explaining the first observation mode. Specifically, (a) in FIG. 27 is a diagram illustrating imaging timing of the imager 214. (b) in FIG. 27 to (f) in FIG. 7 are diagrams corresponding to (b) in FIG. 8 to (f) in FIG. 8, respectively.

The control unit 61 controls the imager 214 as described below.

The control unit 61 causes the imager 214 to perform imaging at a predetermined frame rate. Because the imager 214 is a global shutter CCD, in the same frame, all pixels are exposed in the same period (exposure period TE' (a) in FIG. 27), and read at the same timing TR'. The exposure period TE' corresponds to an imaging period.

Moreover, the control unit 61 operates the first rotator 71 by controlling the motor driving unit 53 as described below.

The control unit 61 sets such that the rotation period T1 of the first rotator 71 is the same period as a frame period of the imager 214 based on the first-rotator position signal as illustrated in (b) in FIG. 27. Furthermore, the control unit 61 sets such that the first-filter absent period TN1 and the first filter-present period TY1 coincide with the exposure period TE' based on the first-optical-filter position signal as illustrated in (c) in FIG. 27.

Other processing performed by the control unit 61 is similar to the processing in the first observation mode explained in the first embodiment described above. That is, the phase in the rotation period T2 of the second rotator 81 is set to be the same as the phase in the first rotation period T1 of the first rotator 71. Moreover, the first to the fifth light sources 5111 to 5115 are lit in the first filter-absent period TN1 (second filter-absent period TN2). That is, the light source device 5 for an endoscope emits white light in which the violet light V, the blue light B, the first green light G1, the first amber light A1, and the red light R are combined to the other end of the light guide 211 in the first filter-absent period TN1 (second filter-absent period TN2).

Second Observation Mode

Next, the processing of the control unit 61 in the second observation mode will be explained.

Figure 28:
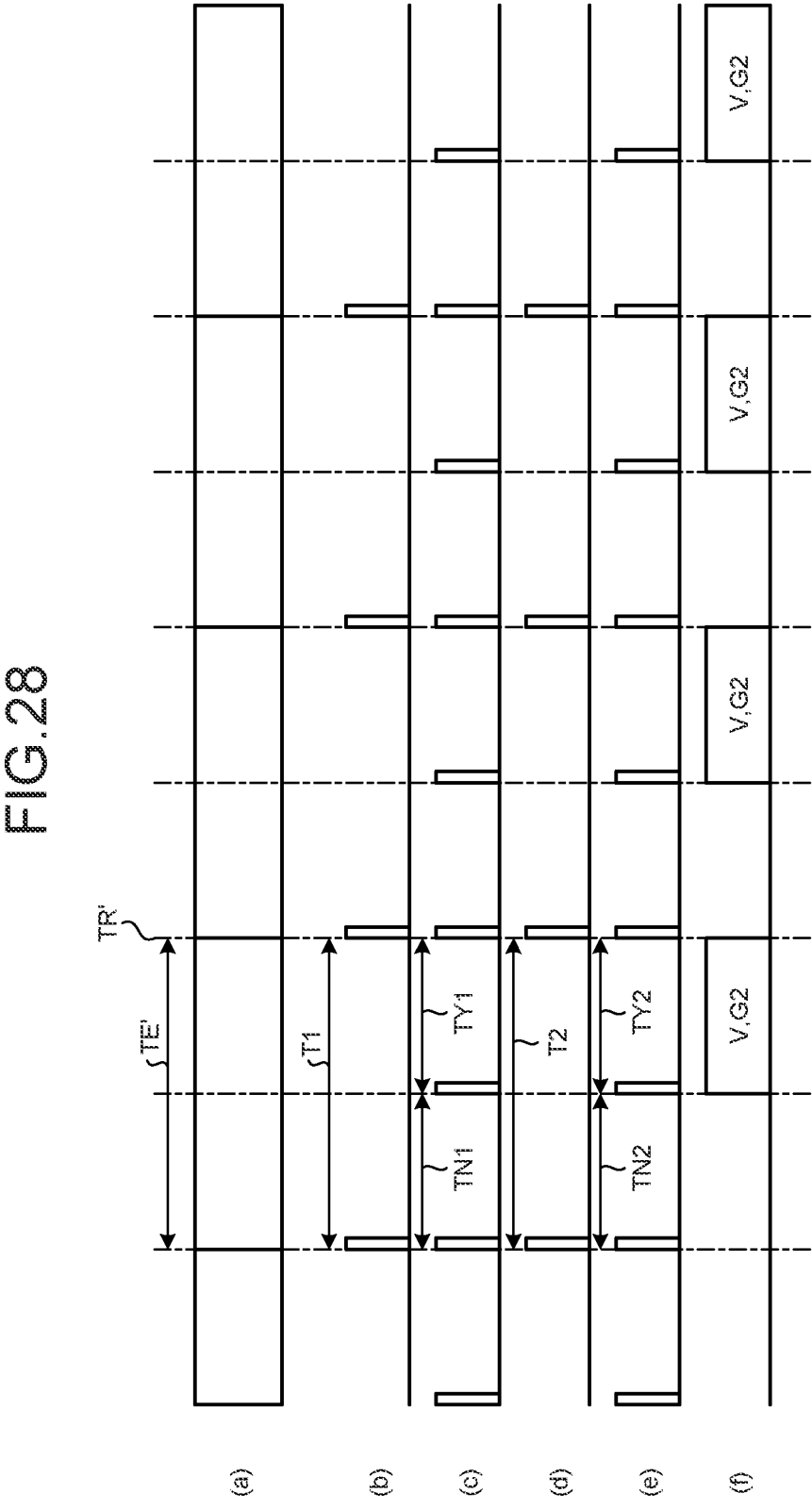
FIG. 28 is a time chart explaining a second observation mode according to the fourth embodiment.

FIG. 28 is a time chart explaining the second observation mode. Specifically, (a) in FIG. 28 to (f) in FIG. 28 are diagrams corresponding to (a) in FIG. 27 to (f) in FIG. 27, respectively.

The control unit 61 controls the imager 214 as illustrated in (a) in FIG. 28, similarly to the first observation mode illustrated in (a) in FIG. 27.

Moreover, the control unit 61 operates the first and the second rotators 71 and 81 as illustrated in (b) in FIG. 28 to (e) in FIG. 28, similarly to the first observation mode illustrated in (b) in FIG. 27 to (e) in FIG. 27.

Other processing performed by the control unit 61 is similar to the processing in the second observation mode explained in the first embodiment described above. That is, the first and the third light sources 5111 and 5113 are lit in the first filter-present period TY1 (second filter-present period TY2). Thus, the light source device 5 for an endoscope emits light in which the violet light V and the second green light G2 are combined to the other end of the light guide 211 in the first filter-present period TY1 (second filter-present period TY2).

Third Observation Mode

Next, the processing of the control unit 61 in the third observation mode will be explained.

Figure 29:
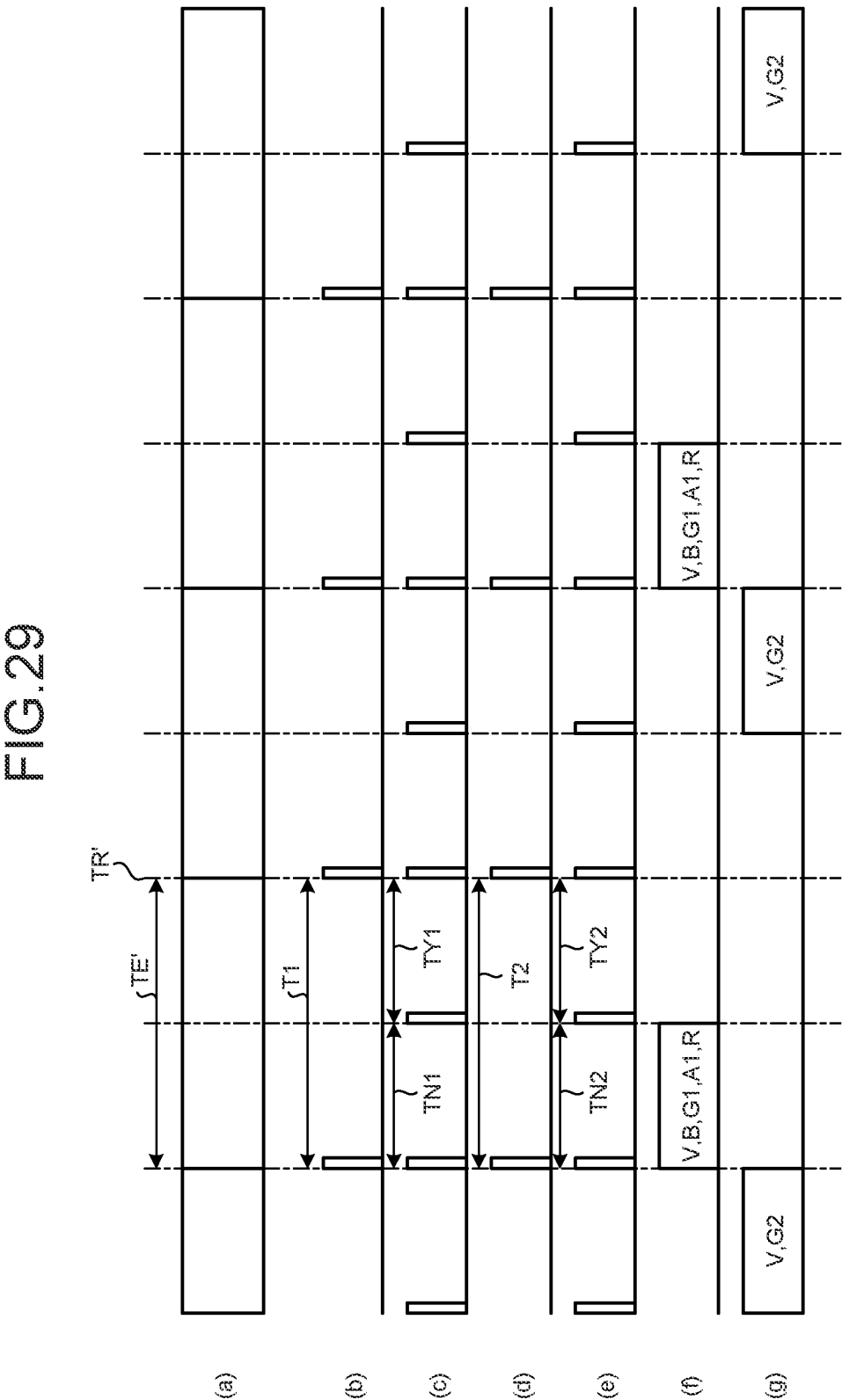
FIG. 29 is a time chart explaining a third observation mode according to the fourth embodiment.

FIG. 29 is a time chart explaining the third observation mode. Specifically, (a) in FIG. 29 to (e) in FIG. 29 are diagrams corresponding to (a) in FIG. 27 to (e) in FIG. 27, respectively. (f) in FIG. 29 and (g) in FIG. 29 are diagrams corresponding to (f) in FIG. 27.

The control unit 61 controls the imager 214 as illustrated in (a) in FIG. 29, similarly to the first observation mode illustrated in (a) in FIG. 27.

Moreover, the control unit 61 operates the first and the second rotators 71 and 81 as illustrated in (b) in FIG. 29 to (e) in FIG. 29, similarly to the first observation mode illustrated in (b) in FIG. 27 to (e) in FIG. 27.

Other processing performed by the control unit 61 is similar to the processing in the third observation mode explained in the first embodiment described above. That is, the first to the fifth light sources 5111 to 5115 are lit in the first filter-absent period TN1 (second filter-absent period TN2). Thus, the light source device 5 for an endoscope emits white light in which the violet light V, the blue light B, the first green light G1, the first amber light A1, and the red light R are combined to the other end of the light guide 211 in the first filter-absent period TN1 (second filter-absent period TN2). Moreover, the first and the third light sources 5111 and 5113 are lit in the first filter-present period TY1 (second filter-present period TY2). Thus, the light source device 5 for an endoscope emits light in which the violet light V and the second green light G2 are combined to the other end of the light guide 211 in the first filter-present period TY1 (second filter-present period TY2).

Fourth Observation Mode

Next, the processing of the control unit 61 in the fourth observation mode will be explained.

Figure 30:
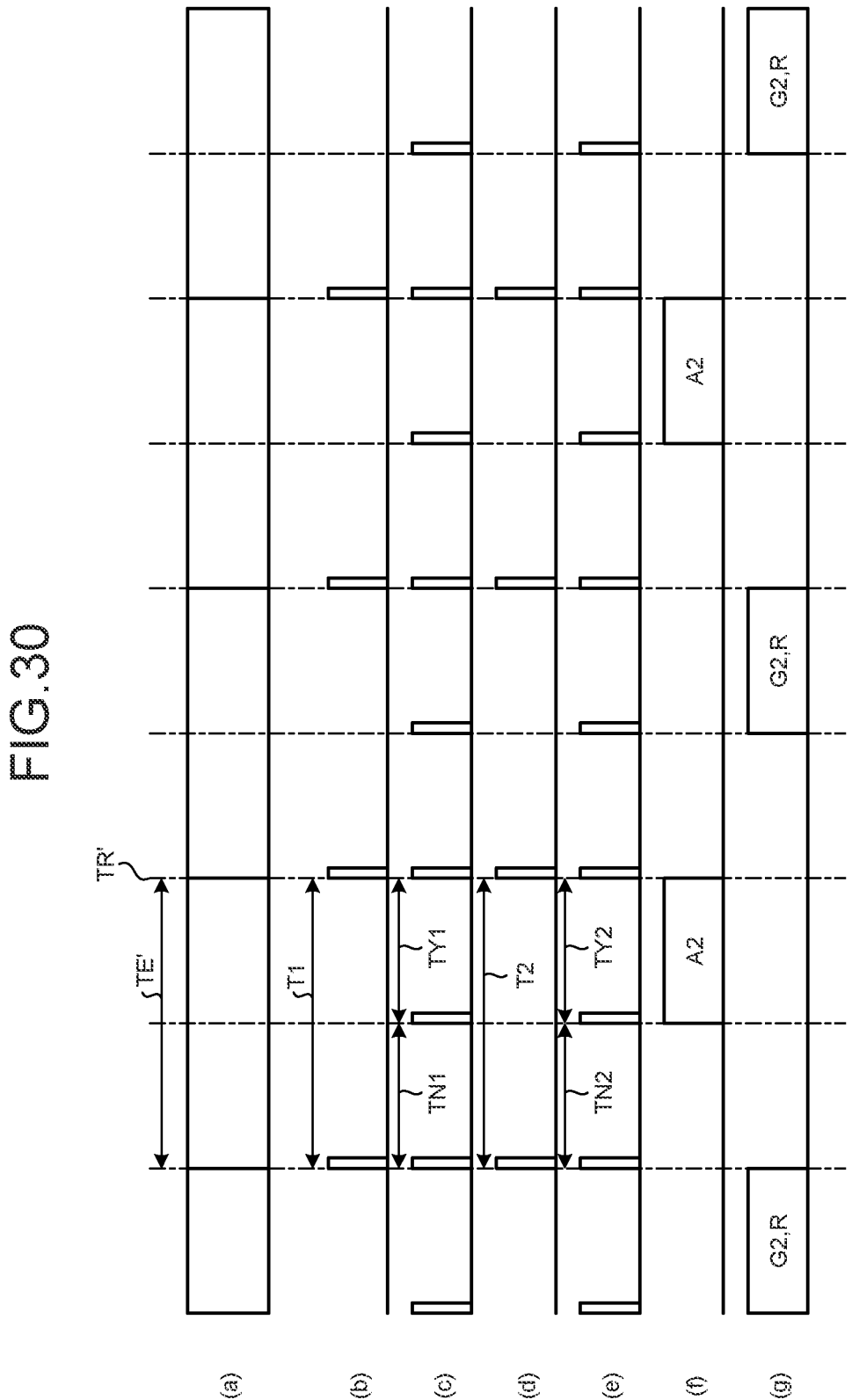
FIG. 30 is a time chart explaining a fourth observation mode according to the fourth embodiment.

FIG. 30 is a time chart explaining the fourth observation mode. Specifically, (a) in FIG. 30 to (e) in FIG. 30 are diagrams corresponding to (a) in FIG. 27 to (e) in FIG. 27, respectively. (f) in FIG. 30 to (g) in FIG. 30 are diagrams corresponding to (f) in FIG. 27.

The control unit 61 controls the imager 214 as illustrated in (a) in FIG. 30, similarly to the first observation mode illustrated in (a) in FIG. 27.

Moreover, the control unit 61 operates the first and the second rotators 71 and 81 as illustrated in (b) in FIG. 30 to (e) in FIG. 30 by controlling the motor driving unit 53, similarly to the first observation mode illustrated in (b) in FIG. 27 to (e) in FIG. 27.

The control unit 61 lights the fourth light source 5514 and the third and the fifth light sources 3113 and 3115 alternately in the respective first filter-present period TY1 (second filter-present period TY2) as illustrated in (f) in FIG. 30 by controlling the light-source driving unit 52. Thus, the light source device 5 for an endoscope emits the second amber light A2, and the second green light G2 and the red light R alternately to the other end of the light guide 211 in the first filter-present period TY1 (second filter-present period TY2).

Other processing performed by the control unit 61 is similar to the processing in the fourth observation mode explained in the first embodiment described above.

Fifth Observation Mode

Next, the processing of the control unit 61 in the fifth observation mode will be explained.

Figure 31:
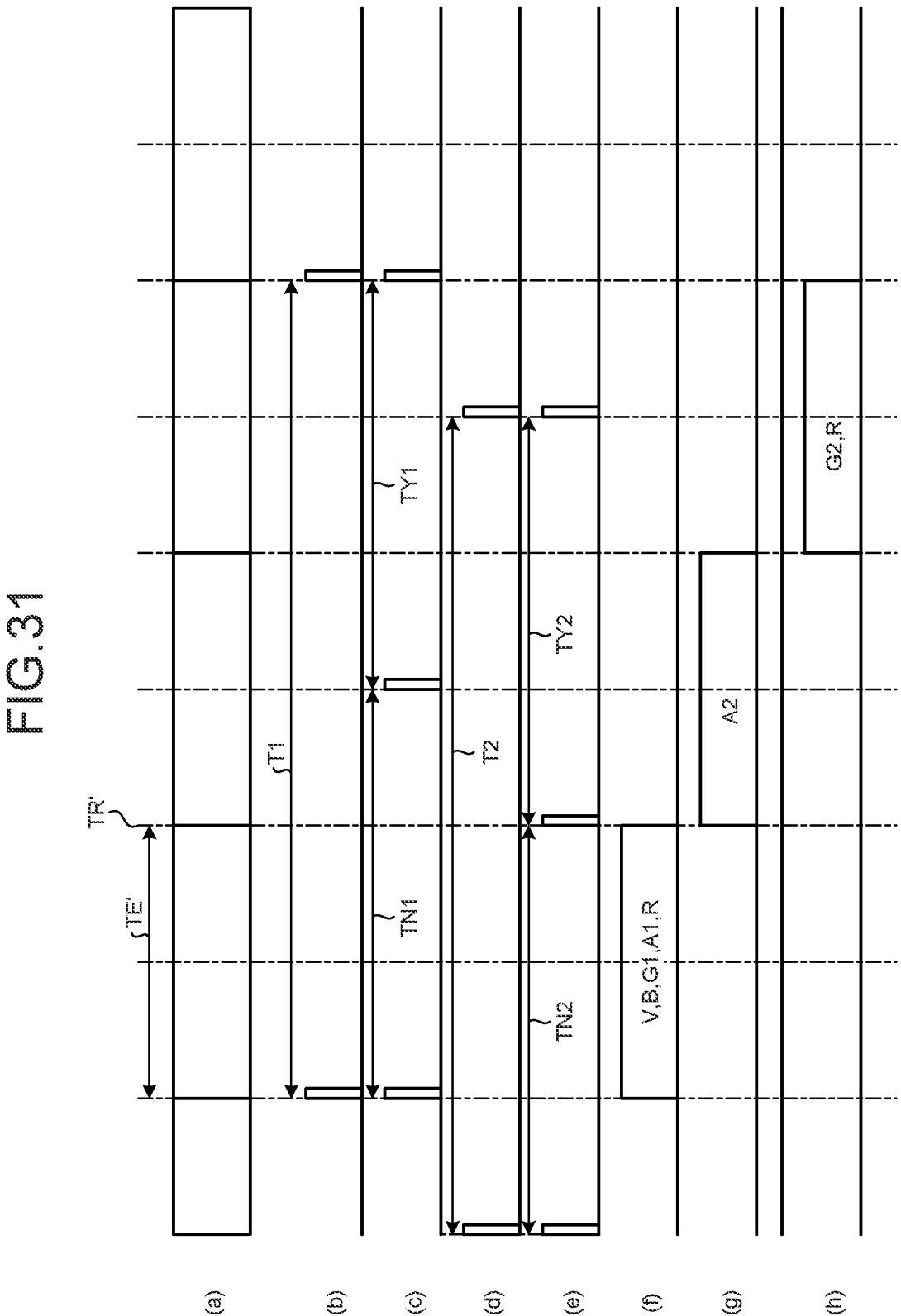
FIG. 31 is a time chart explaining a fifth observation mode according to the fourth embodiment.

FIG. 31 is a time chart explaining the fifth observation mode. Specifically, (a) in FIG. 31 to (e) in FIG. 31 are diagrams corresponding to (a) in FIG. 27 to (e) in FIG. 27, respectively. (f) in FIG. 31 to (h) in FIG. 31 are diagrams corresponding to (f) in FIG. 27.

The control unit 61 controls the imager 214 as illustrated in (a) in FIG. 31, similarly to the first observation mode illustrated in (a) in FIG. 27.

Furthermore, the control unit 61 operates the first rotator 71 by controlling the motor driving unit 53 as described below.

The control unit 61 sets such that the rotation period T1 of the first rotator 71 is the same period as a three-frame period of the imager 214 as illustrated in (b) in FIG. 31 based on the first-rotator position signal. Moreover, the control unit 61 sets such that a start timing of the first filter-absent period TN1 coincides with a start timing of exposure period TE' (readout timing TR') based on the first-optical-filter position signal.

Furthermore, the control unit 61 operates the second rotator 81 by controlling the motor driving unit 53 as described below.

The control unit 61 sets such that the rotation period T2 of the second rotator 81 is the same period as a three-frame period of the imager 214 as illustrated in (d) in FIG. 31. Moreover, the control unit 61 shifts phases by 60° in the rotation periods T1 and T2 of the first and the second rotators 71 and 81 based on the first-optical-filter position signal, and sets such that a start timing of the second filter-present period TY2 coincides with the start timing of the exposure period TE' (readout timing TR') as illustrated in (e) in FIG. 31.

The control unit 61 lights the first to the fifth light sources 5111 to 5115 by controlling the light-source driving unit 52 as described below.

The control unit 61 lights the first to the fifth light sources 5111 to 5115 in the exposure period TE' in the first and the second filter-absent periods TN1 and TN2 in the exposure period TE' as illustrated in (f) in FIG. 31. Thus, the light source device 5 for an endoscope emits white light in which the violet light V, the blue light B, the first green light G1, the first amber light A1, and the red light R are combined to the other end of the light guide 211 in the exposure period TE in the first and the second filter-absent periods TN1 and TN2.

Moreover, the control unit 61 lights the fourth light source 5114 in the exposure period TE' in the second filter-present period TY2 as illustrated in (g) in FIG. 31. Thus, the light source device 5 for an endoscope emits the second amber light A2 to the other end of the light guide 211 in the exposure period TE' in the second filter-present period TY2.

Furthermore, the control unit 61 lights the third and the fifth light sources 5113 and 5115 in the exposure period TE' in the first filter-present period TY1 as illustrated in (h) in FIG. 31. Thus, the light source device 5 for an endoscope emits the second green light G2 and the red light R to the other end of the light guide 211 in the exposure period TE' in the first filter period TY1.

Other processing performed by the control unit 61 is similar to the processing in the fifth observation mode explained in the first embodiment described above.

As the fourth embodiment explained above, even when a global shutter CCD is adopted as the imager 214, similar effects to the first embodiment described above can be produced.

Modification of Fourth Embodiment

In the fourth embodiment described above, as the processing of the control unit 61 in the fourth observation mode, following processing may be adopted.

Figure 32:
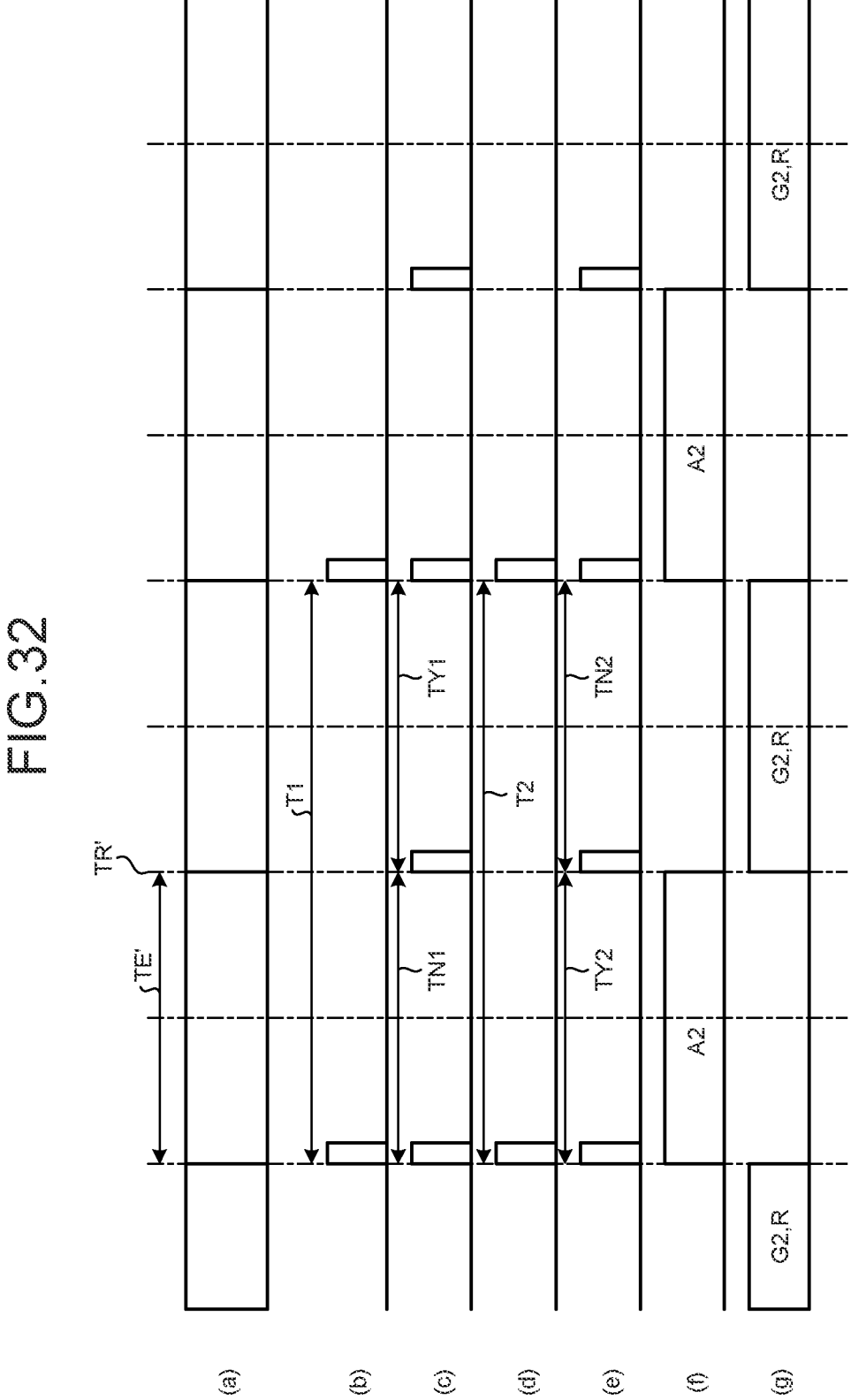
FIG. 32 is a diagram illustrating a modification of the fourth embodiment.

FIG. 32 is a diagram illustrating a modification of the fourth embodiment. Specifically, (a) in FIG. 32 to (g) in FIG. 32 are diagrams corresponding to (a) in FIG. 30 to (g) in FIG. 30.

The control unit 61 controls the imager 214 as illustrated in (a) in FIG. 32, similarly to the fourth observation mode illustrated in (a) in FIG. 30.

Moreover, the control unit 61 operates the first rotator 71 by controlling the motor driving unit 53 as described below.

The control unit 61 sets such that the rotation period T1 of the first rotator 71 is the same period as a two-frame period of the imager 214 as illustrated in (b) in FIG. 32 based on the first-rotator position signal. Furthermore, the control unit 61 sets such that the first filter-absent period TN1 and the second filter-present period TY1 alternately coincide with the respective exposure periods TE' as illustrated in (c) in FIG. 32 based on the first-optical-filter position signal.

Moreover, the control unit 61 operates the second rotator 81 by controlling the motor driving unit 53 as described below.

The control unit 61 sets such that the rotation period T2 of the second rotator 81 is the same period as a two-frame period of the imager 214 as illustrated in (d) in FIG. 32 based on the second-rotator position signal. Furthermore, the control unit 61 shifts a phase in the rotation period T2 of the second rotator 81 by 180° from a phase in the rotation period T1 of the first rotator 71 as illustrated in (e) in FIG. 32 based on the second-optical-filter position signal.

The control unit 61 lights the first to the fifth light sources 5111 to 5115 by controlling the light-source driving unit 52 as described below.

The control unit 61 lights the fourth light source 5114 in the second filter-present period TY2 (exposure period TE') as illustrated in (f) in FIG. 32. Thus, the light source device 5 for an endoscope emits the second amber light A2 to the other end of the light guide 211 in the second filter-present period TY2 (exposure period TE').

Moreover, the control unit 61 lights the third and the fifth light sources 5113 and 5115 in the first filter-present period TY1 (exposure period TE') as illustrated in (g) in FIG. 32. Thus, the light source device 5 for an endoscope emits the second green light G2 and red light R to the other end of the light guide 211 in the first filter-present period TY1 (exposure period TE').

Other processing performed by the control unit 61 is similar to the processing in the fourth observation mode explained in the fourth embodiment described above.

In the fourth modification of the fourth embodiment explained above, it is necessary to configure the rotation periods T1 and T2 in the fourth observation mode different from the rotation periods T1 and T2 in the first to the third observation modes. However, because emission time of the second amber light A2, the second green light G2, and the red light R increases, by increasing an exposure of the respective lights A2, G2, and R in the imager 214, it is possible to reduce image noise.

Other Embodiment

Figure 33:
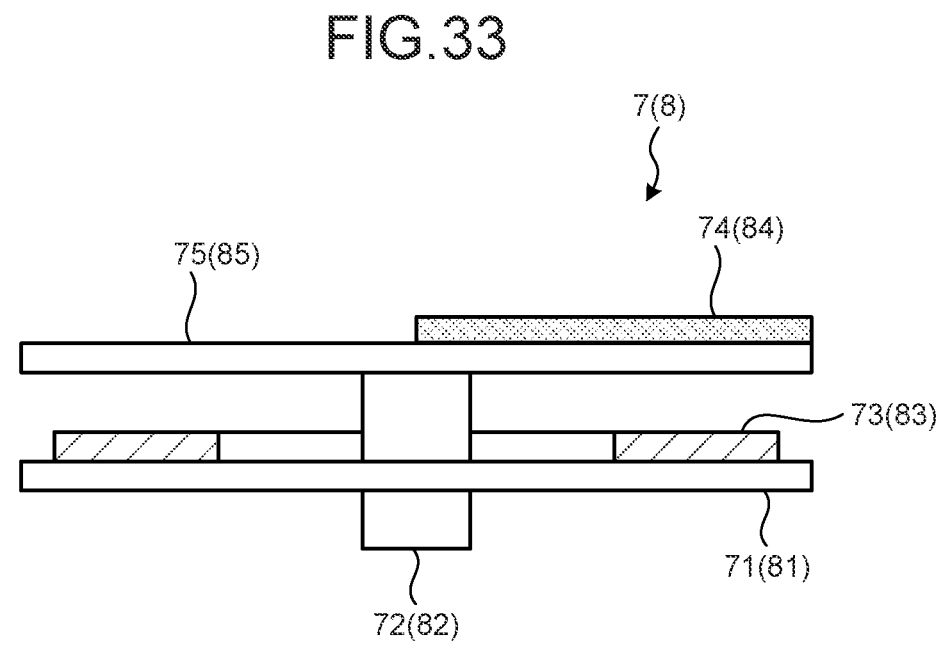

Embodiments to implement the disclosure has so far been explained, but the disclosure is not to be limited to the first to the fourth embodiments described above. FIG. 33 is a diagram illustrating modifications of the first to the fourth embodiments. Specifically, FIG. 33 is a diagram corresponding to FIG. 3 and FIG. 6.

The first and the second rotation units 7 and 8 according to a modification illustrated in FIG. 33 have substantially the same configurations. Therefore, in the following, the first rotation unit 7 will be explained mainly. Moreover, in FIG. 33, after reference signs indicating components of the first rotation unit 7, reference signs indicating components of the second rotation unit 8 substantially the same as the components of the first rotation unit 7 are given in brackets.

In the first rotation unit 7 according to the present modification, the first optical filter 74 is arranged on one of plate surfaces of a supporting plate in a disc shape composed of a transparent material, such as glass as illustrated in FIG. 33. In FIG. 33, a reference sign "85" assigned in brackets after a reference sign "75" indicates a supporting plate 85 to support the second optical filter 84. The supporting plate 75 (first optical filter 74) is arranged, keeping a gap from the first fluorescent material 73 in the direction along the first center axis Ax1. Thus, the first optical filter 74 is arranged so as to cover a part of the first fluorescent material 73 from the direction along the first center axis Ax1.

Also when the first and the second rotation units 7 and 8 according to the modification illustrated in FIG. 33 are adopted, effects similar to the first to the fourth embodiments described above are produced. Moreover, because there is a gap between the first optical filter 74 and the first fluorescent material 73, the cooling efficiency of the first optical filter 74 and the first fluorescent material 73 is improved, and thermal degradation can be suppressed. It is similarly applied to the second optical filter 84 and the second fluorescent material 83 also.

In the first to the fourth embodiments described above, the second rotator 81 is rotated in the second observation mode, but it is not limited thereto. In the second observation mode, because the first and the second amber lights A1 and A2 are not used, rotation of the second rotator 81 may be stopped in a state of being stopped at an arbitrary rotation position.

In the first to the fourth embodiments described above, to prevent surface runout at the time of rotation of the first rotator 71 that includes the first fluorescent material 73 and the first optical filter 74, a following configuration may be adopted.

That is, a member to match the center of gravity of the first rotator 71 that includes the first fluorescent material 73 and the first optical filter 74 with the first center axis Ax1 may be attached to the first rotator 71.

According to a light source device, a control method, and a control program according to the disclosure, light of a specific wavelength band can be adjusted without scaling up a device structure.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
a fluorescent material configured to rotate about a rotation axis, and emit fluorescence upon reception of excitation light;
a light source configured to emit the excitation light;
an optical filter that is arranged to cover a part of the fluorescent material from a direction along the rotation axis, the optical filter being configured to pass light of some wavelength band in the fluorescence generated by excitation of the fluorescent material; and
a first processor configured to control a rotation operation of the fluorescent material about the rotation axis, and an operation of the light source, the first processor being configured to control the rotation operation of the fluorescent material such that the optical filter is placed at and removed from an irradiation position at which the excitation light is irradiated to the fluorescent material according to an imaging period in which the fluorescence reflected from a subject is captured by an imager;
wherein the fluorescence generated by the excitation of the fluorescent material is fluorescence including a wavelength band of amber.

2. The light source device according to claim 1, wherein the optical filter is configured to cover the part of the fluorescent material in an intimate state attached to the fluorescent material in the direction along the rotation axis.

3. The light source device according to claim 1, wherein the optical filter is configured to cover the part of the fluorescent material, keeping a gap from the fluorescent material in the direction along the rotation axis.

4. The light source according to claim 1 further comprising a driving source configured to rotate the fluorescent material,

wherein the fluorescent material and the optical filter are rotated in an integrated manner by a single unit of the driving source.

5. The light source device according to claim 1, wherein the optical filter includes
a first area that extends throughout an entire circumference in a rotation direction about the rotation axis; and
a second area that is arranged at a different position from the first area in a radial direction of the fluorescent material, and that is arranged at a part of the entire circumference in the rotation direction about the rotation axis,
the fluorescent material includes
a third area that is not covered by the optical filter throughout the entire circumference in the rotation direction about the rotation axis from the direction along the rotation axis, and
the fluorescent material and the optical filter are configured to position each of the first area, the second area and the third area with respect to the irradiation position at which the excitation light is irradiated.

6. The light source device according to claim 1, wherein the light source includes
a first excitation-light source configured to emit a first excitation light; and
a second excitation-light source configured to emit a second excitation light,
the fluorescent material includes
a first fluorescent material configured to rotate about a first rotation axis, and emit first fluorescence upon reception of the first excitation light; and
a second fluorescent material configured to rotate about a second rotation axis, and emit second fluorescence including a wavelength band different from a wavelength band of the first fluorescence upon reception of the second excitation light, and
the optical filter includes
a first optical filter that is arranged to cover a part of the first fluorescent material from a direction along the first rotation axis, the first optical filter being configured to pass light of some wavelength band in the first fluorescence; and
a second optical filter that is arranged to cover a part of the second fluorescent material from a direction along the second rotation axis, the second optical filter being configured to pass light of some wavelength band in the second fluorescence.

7. The light source device according to claim 6, further comprising
a second processor configured to control a rotation operation of the first fluorescent material about the first rotation axis and a rotation operation of the second fluorescent material about the second rotation axis, wherein
the processor is configured to control the rotation operation of the first fluorescent material and the rotation operation of the second fluorescent material to change a phase in a rotation period of the first fluorescent material about the first rotation axis and a phase in a rotation period of the second fluorescent material about the second rotation axis.

8. The light source device according to claim 6, wherein the first fluorescence generated by the excitation of the first fluorescent material is fluorescence including a wavelength band of amber; and the second fluorescence generated by the excitation of the second fluorescent material is fluorescence including a wavelength band of green.

9. The light source device according to claim 1, wherein the first processor is configured to:

in a first observation mode, control the rotation operation of the fluorescent material to set such that the imaging period and a first period in which an area without the optical filter is positioned at the irradiation position at which the excitation light is irradiated to the fluorescent material overlap, the first observation mode being a normal observation mode to observe the subject by using the fluorescence that has been generated upon the excitation of the fluorescent material and that has not passed through the optical filter; and light the light source in a second period in which the imaging period and the first period overlap.

10. The light source device according to claim 9, wherein the first processor is configured to:

in a second observation mode, control the rotation operation of the fluorescent material to set such that the imaging period and a third period in which an area with the optical filter is positioned at the irradiation position overlap, the second observation mode being a special light observation to observe the subject by using the fluorescence that has been generated by the excitation of the fluorescent material and that has passed through the optical filter; and light the light source in a fourth period in which the imaging period and the second period overlap.

11. The light source device according to claim 10, wherein the first processor is configured to:

in a third observation mode, control the rotation operation of the fluorescent material to set such that the first period and the third period alternately overlap with the imaging period, the third observation mode being a mode in which the normal observation and the special light observation are performed at a same time; and light the light source in both of the second period and the fourth period.

12. A control method performed by a processor of a light source device including a fluorescent material configured to rotate about a rotation axis, and emit fluorescence upon reception of excitation light, a light source configured to emit the excitation light, and an optical filter that is arranged to cover a part of the fluorescent material from a direction along the rotation axis, the optical filter being configured to pass light of some wavelength band in the fluorescence generated by excitation of the fluorescent material, the method comprising:

in a first observation mode, controlling a rotation operation of the fluorescent material to set such that an imaging period in which the fluorescence reflected from a subject is captured by an imager and a first period in which an area without the optical filter is positioned at an irradiation position at which the excitation light is irradiated to the fluorescent material overlap, the first observation mode being a normal observation mode to observe the subject by using the fluorescence that has been generated upon the excitation of the fluorescent material and that has not passed through the optical filter; and lighting the light source in a second period in which the imaging period and the first period overlap.

13. A non-transitory computer-readable recording medium that stores a computer program to be executed by a processor of a light source device including a fluorescent material configured to rotate about a rotation axis, and emit fluorescence upon reception of excitation light, a light source configured to emit the excitation light, and an optical filter that is arranged to cover a part of the fluorescent material from a direction along the rotation axis, the optical filter being configured to pass light of some wavelength band in the fluorescence generated by excitation of the fluorescent material, the program causing the processor to execute:

in a first observation mode, controlling a rotation operation of the fluorescent material to set such that an imaging period in which the fluorescence reflected from a subject is captured by an imager and a first period in which an area without the optical filter is positioned at an irradiation position at which the excitation light is irradiated to the fluorescent material overlap, the first observation mode being a normal observation mode to observe the subject by using the fluorescence that has been generated upon the excitation of the fluorescent material and that has not passed through the optical filter; and lighting the light source in a second period in which the imaging period and the first period overlap.

* * * * *